(12) United States Patent
Goldfarb et al.

(10) Patent No.: US 10,084,642 B2
(45) Date of Patent: Sep. 25, 2018

(54) AUTOMATED SENSING OF NETWORK CONDITIONS FOR DYNAMICALLY PROVISIONING EFFICIENT VPN TUNNELS

(71) Applicant: ALTR Solutions, Inc., Satellite Beach, FL (US)

(72) Inventors: Scott Nathaniel Goldfarb, Washington, MI (US); Christopher Edward Struttmann, Indialantic, FL (US)

(73) Assignee: ALTR SOLUTIONS, INC., Satellite Beach, FL (US)

( * ) Notice: Subject to any disclaimer, the term of this patent is extended or adjusted under 35 U.S.C. 154(b) by 0 days.

(21) Appl. No.: 15/675,554

(22) Filed: Aug. 11, 2017

(65) Prior Publication Data

US 2017/0366395 A1    Dec. 21, 2017

Related U.S. Application Data

(63) Continuation-in-part of application No. 15/171,347, filed on Jun. 2, 2016.

(60) Provisional application No. 62/374,359, filed on Aug. 12, 2016, provisional application No. 62/169,823, filed on Jun. 2, 2015.

(51) Int. Cl.
    *H04L 12/24*    (2006.01)
    *H04L 12/46*    (2006.01)
    *H04L 12/26*    (2006.01)
    *H04L 29/06*    (2006.01)

(52) U.S. Cl.
    CPC ...... *H04L 41/0803* (2013.01); *H04L 12/4641* (2013.01); *H04L 43/08* (2013.01); *H04L 41/12* (2013.01); *H04L 41/22* (2013.01); *H04L 43/16* (2013.01); *H04L 67/42* (2013.01)

(58) Field of Classification Search
    CPC ..... H04L 12/4641; H04L 43/08; H04L 41/12; H04L 45/04; H04L 63/0209; H04L 63/0272; H04L 63/0281; H04L 63/0428; H04L 63/16; H04L 12/4633
    See application file for complete search history.

(56) References Cited

U.S. PATENT DOCUMENTS 7,111,163 B1 *   9/2006   Haney ................. H04L 12/4633
                                                          709/227
7,606,191 B1 *  10/2009   Breau ................. H04L 12/4641
                                                          370/328
(Continued)

OTHER PUBLICATIONS

Cisco Dynamic Multipoint VPN: Simple and Secure Branch to Branch Communications, http://www.cisco.com/c/en/us/products/collateral/security/dynamicmultipointvpndmvpn/data_sheet_c78468520_html, Mar. 13, 2015, pp. 1 to 8.

(Continued)

*Primary Examiner* — Vivek Srivastava
*Assistant Examiner* — Muhammad Raza
(74) *Attorney, Agent, or Firm* — Pillsbury Winthrop Shaw Pittman LLP

(57) ABSTRACT

Provided is a process including: executing a virtual private network client application on a client computing device; communicating between the client computing device and a virtual private network server; sensing network conditions of a virtual private network connection; and selecting a set of configuration settings from among the different respective sets of configuration settings based on the network conditions.

26 Claims, 10 Drawing Sheets

(56) References Cited

U.S. PATENT DOCUMENTS

| | | | | |
|---|---|---|---|---|
| 9,219,709 B2* | 12/2015 | Lindteigen | ........... | H04L 63/0272 |
| 2003/0016681 A1 | 1/2003 | Lampola | | |
| 2003/0177396 A1* | 9/2003 | Bartlett | ............... | H04L 12/4641 |
| | | | | 726/15 |
| 2003/0219022 A1* | 11/2003 | Dillon | ................ | H04L 12/2856 |
| | | | | 370/395.52 |
| 2005/0193103 A1* | 9/2005 | Drabik | ................ | H04L 63/0272 |
| | | | | 709/221 |
| 2006/0174336 A1 | 8/2006 | Chen | | |
| 2010/0138909 A1 | 6/2010 | Chen | | |
| 2012/0239626 A1 | 9/2012 | Aysan et al. | | |
| 2013/0170502 A1* | 7/2013 | Chen | ................... | H04L 63/0272 |
| | | | | 370/401 |
| 2013/0182712 A1* | 7/2013 | Aguayo | .............. | H04L 12/4633 |
| | | | | 370/395.53 |
| 2014/0298446 A1* | 10/2014 | Grand | .................. | H04L 45/302 |
| | | | | 726/15 |

OTHER PUBLICATIONS

Configuring Dual Tunnel with Cisco IOS Easy VPN Using Auto Configuration Update, https://www.cisco.com/c/en/us/products/collateral/ios-nx-os-software/ios-ipsec/prod_white_paper0900aecd8039e301.html?dtid=osscdc000283, Dec. 7, 2005, pp. 1 to 18.

My VPN is slow, what can I do to make it faster?', https://www.ivpn.net/knowledgebase/66/MyVPNisslowwhatcanIdotomakeitfaster.html, Aug. 8, 2016, pp. 1 to 7.

Using Auto Policy to Configure VPN Tunnels, http://documentation.netgear.com/dg834g/enu/202103630l/DG834Gv5_RM_29Jun0816.html, Aug. 8, 2016, pp. 1 to 8.

Software-Defined Networks for Future Networks and Services, http://resourcecenter.fd.ieee.org/fd/product/white-papers/FDSDNXXINP0001, Jan. 29, 2014, pp. 1 to 16.

* cited by examiner

Add Thresholds     180

Trigger(s)   182

Select the triggers and variables for this threshold.

✓ Access Rate    ✓ Time Window    ○ IP Address    184

ACCESS LIMIT * is accessed over   100     times per   Hour

186 is accessed between   08 : 00   AM   -   05 : 00   PM

TIMEZONE (UTC-05:00) America/Chicago    on    5 Days Selected

Monday    Tuesday    Wednesday    Thursday

Friday

Actions

Identify the action you want ALTR to take on a user device when the rule is violated.

○    ✓ Block
188    190

[ CREATE ]

FIG. 7

AUTOMATED SENSING OF NETWORK CONDITIONS FOR DYNAMICALLY PROVISIONING EFFICIENT VPN TUNNELS

CROSS-REFERENCE TO RELATED APPLICATIONS

This patent claims the benefit of U.S. Provisional Patent Application 62/374,359, titled AUTOMATED SENSING OF NETWORK CONDITIONS FOR DYNAMICALLY PROVISIONING EFFICIENT VPN TUNNELS, filed 12 Aug. 2016; and the present patent is a continuation-in-part of U.S. patent application Ser. No. 15/171,347, titled COMPUTER SECURITY AND USAGE-ANALYSIS SYSTEM, filed 2 Jun. 2016, which claims the benefit of U.S. Provisional Patent Application 62/169,823, filed 2 Jun. 2015. The entire content of each of these earlier-filed applications, and content incorporated by reference therein, is hereby incorporated by reference for all purposes.

BACKGROUND

1. Field

The present disclosure relates generally to cybersecurity and, more specifically, to configuring virtual private networks.

2. Description of the Related Art

Often entities, like businesses and governmental organizations, maintain private networks, such as local area networks, in which the entity is responsible for configuring the network. This is in contrast to many public networks, like the Internet, in which much of the network configuration tasks are outsourced. Local area (and other private) networks often include an address space, firewalls, routers, servers, clients, printers, fax machines, displays, and various network appliances. Tailoring configuration of these networks can be a remarkably complex task, and crafting rules to securely monitor and enforce policies on these networks is similarly challenging in many cases.

SUMMARY

The following is a non-exhaustive listing of some aspects of the present techniques. These and other aspects are described in the following disclosure.

Some aspects include a process, including: executing, with one or more processors, a virtual private network client application on a client computing device; connecting, with one or more processors, the client computing device to a virtual private network server via one or more virtual private network connections, wherein: the one or more virtual private network connection each form an encrypted tunnel between the client computing device and the virtual private network server; the one or more virtual private network connections apply different respective sets of configuration settings to configure the respective virtual private network connection; the different respective sets of configuration settings are applied concurrently on different virtual private network connections, on the same virtual private network connection at different times, or both; the different respective sets of configuration settings each include a plurality of different adjustable parameters by which virtual private network connections between the client computing device and the virtual private network server are configured; and each of the parameters takes a different value between at least one pair of the different respective sets of configuration settings; communicating or attempting to communicate, with one or more processors, between the client computing device and the virtual private network server via each of the one or more virtual private network connections while the different sets of configuration settings are applied; sensing, with one or more processors, a plurality of sets of one or more metrics of network conditions of the one or more virtual private network connections during communicating or attempting to communicate while the different sets of configuration settings are applied; selecting, with one or more processors, a set of configuration settings from among the different respective sets of configuration settings based on the plurality of sets of one or more metrics; and communicating, with one or more processors, between the virtual private network server and the client computing device with a virtual private network connection configured with the selected set of configuration settings, wherein: virtual private network connection settings are automatically configured based on sensed network conditions.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 7 is a graphical user interface through which a user may interact with the process of FIG. 6 to configure or view rules in accordance with some embodiments of the present techniques;

Figure 1:
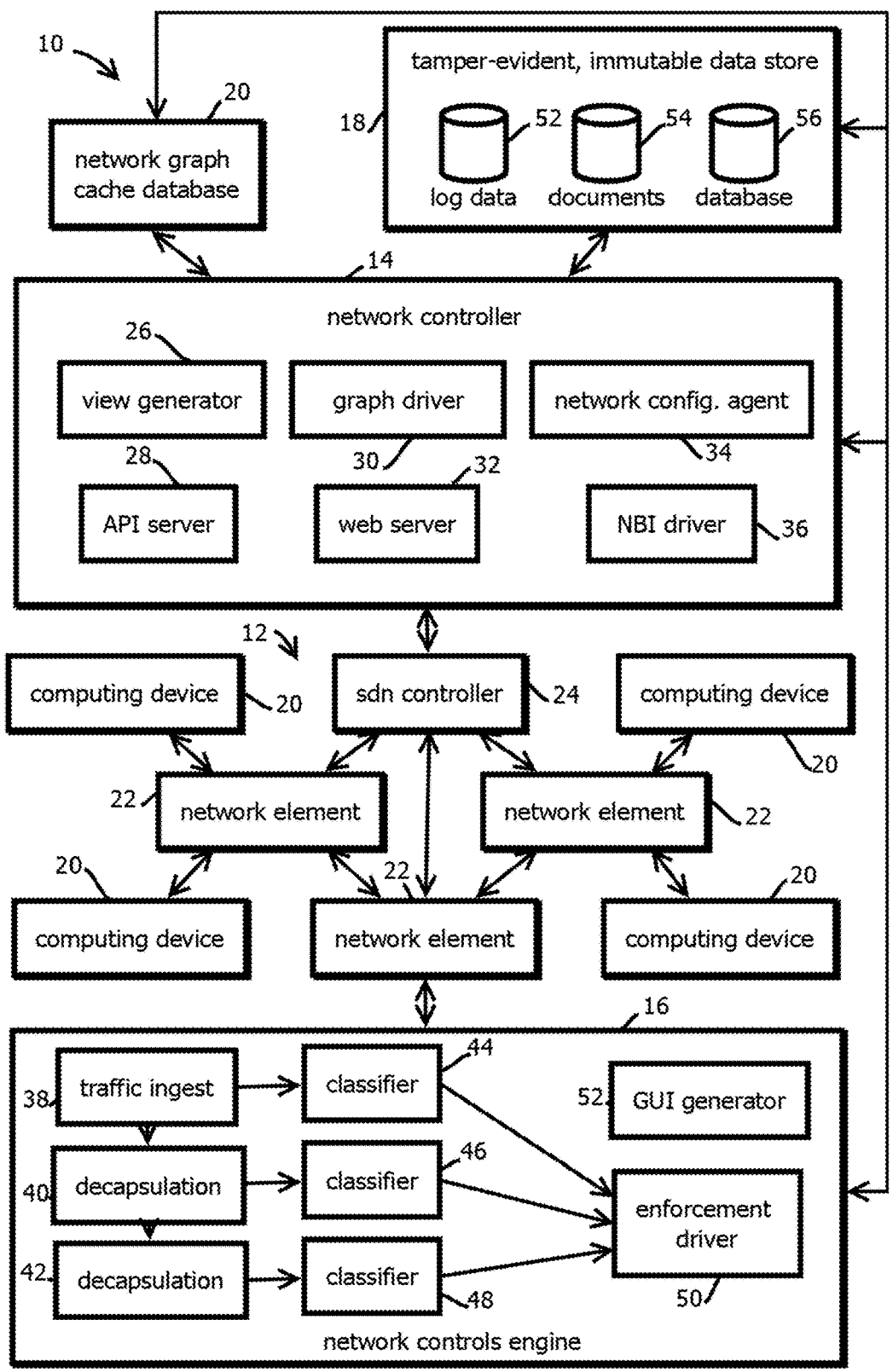
FIG. 1 is a combined logical and physical architecture block diagram that shows an example of a computing environment in accordance with some of the present embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of network security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A variety of problems relating to security of networks of computers used by organizations are addressed by various versions of techniques described below. These different techniques can be used together, synergistically in some cases, so their descriptions are grouped into a single description that will be filed in multiple patent applications with different claim sets targeting the different techniques and combinations thereof. In view of this approach, it should be emphasized that the techniques are also independently useful and may be deployed in isolation from one another or in any permutation combining the different subsets of techniques, none of which to suggest that any other description herein is limiting. Conceptually related groups of these techniques are preceded by headings below. These headings should not be read as suggesting that the subject matter underneath different headings may not be combined, that every embodiment described under the heading has all of the features of the heading, or that every feature under a given heading must be present in an embodiment consistent with the corresponding conceptually related group of techniques, again which is not to suggest that any other description is limiting.

Some embodiments described below may place relatively fine-grained control over network traffic and rules by which network traffic is analyzed for security purposes in the hands of less technical users, for example, senior executives at companies and others who wish to manage their network without having to blindly trust highly-skilled information technology professionals otherwise often required to operate the diverse array of relatively arcane software tools and programming languages by which such control is typically exercised. Some embodiments may implement a data model and graphical user interfaces that support these features, and some embodiments may log configurations, rule violations, and changes to configurations to a tamper-evident, immutable data repository described below, such that threat actors are deterred from attempting to circumvent security measures, as their efforts to do so are likely to be detected in virtue of these records.

Further, some embodiments may dynamically, automatically, configure virtual private network connections between computing devices responsive to network conditions. This is expected to improve the performance of such networks and make such networks less intrusive to less skilled users otherwise incapable of configuring the connections. Again, though, not all embodiments afford these benefits, as multiple independently useful techniques are disclosed, none of which is to suggest that any other description is limiting.

These and other techniques described below are best understood in view of an example computing environment 10 in which the techniques may be implemented, as shown in FIG. 1. In some embodiments, the computing environment 10 includes a network 12, managed by a network controller 14, and in some cases being dynamically reconfigured responsive to patterns in network data processed by a network controls engine 16. In some embodiments, log data, and various settings and configurations, as well as changes thereto, may be stored in the tamper-evident immutable data store 18 (also referred to as a data repository), and some embodiments may maintain state of a network graph of permitted network communications in a network-graph cache database 20, which may be mirrored with (e.g., eventual) consistency in the tamper-evident, immutable data store 18, as described in greater detail below.

FIG. 1 exemplifies an environment in which the techniques described in greater detail in subsequent figures may be implemented. In some embodiments, these techniques may also be deployed in a computing environment shown in FIG. 2. In some embodiments, the network graph of permitted communications on network 12 may implement a data structure like that described below with reference to FIG. 3, and that graph may be modified with the process described below with reference to FIG. 4, for example, using a graphical user interface described below with reference to FIG. 5. In some embodiments, patterns in network traffic that present security risks or are otherwise of interest may be detected and processed with rules described below with reference to FIG. 6, and those rules in some cases may be viewed or modified with a graphical user interface described below with reference to FIG. 7. In some cases, the tamper-evident, immutable data store 18 may implement one or more of the data structures described below with reference to FIG. 8, and some embodiments may implement these techniques on a collection of the computing devices like those described below with reference to FIG. 10.

In some embodiments, the computing environment 10 is a geographically distributed computing environment, with various components disposed in different data centers, public clouds, private clouds, local area networks, and the like, and some cases distributed over the United States, North America, or the world. In some embodiments, the network controls engine 16 and the network controller 14, and in some cases other illustrated components, may be implemented on a single computing device, for example, as distinct processes or sets of processes of a monolithic application, or in some embodiments these components, or instances of each of these components, may be distributed among multiple computing devices or other computational entities, for example, on different containers, microkernels, or virtual machines in a service-oriented architecture, such as a micro-services architecture in which the different functional blocks, and in some cases replicated instances thereof behind load balancers, communicate with one another via a network. In some embodiments, these components may communicate with one another via an out-of-band network, on a distinct physical media from the network 12, or in some embodiments, these components may communicate on the same physical media as the network 12.

In some embodiments, some components of the computing environment 10, such as the network controller, the network controls engine, the tamper-evident immutable data store 18, and the network-graph database 20 may be multi-tenant software as a service applications, remotely hosted relative to an entity's computing devices accessing the service, and in some cases storing data from multiple tenants in the same data structures. Or some embodiments may implement single-tenant instances of these components, in some cases in on-premises installations, or in some cases in remote installations, for instance, hosted in a public or private cloud. In some cases, data in the tamper-evident, immutable data repository 18 may be replicated in different data centers, or distrusted among a heterogenous mix of datacenters in accordance with techniques described in a U.S. patent application titled FRAGMENTING DATA FOR THE PURPOSES OF PERSISTENT STORAGE ACROSS MULTIPLE IMMUTABLE DATA STRUCTURES, filed on the same day as this patent application, the contents of which are hereby incorporated by reference.

In some embodiments, the network 12 may be dynamically modified responsive to configuration commands from the network controller 14. These configurations, in some cases may, be changed responsive to patterns detected in network traffic on the network 12 by the network controls engine 16, along with other responsive actions, as described in dated greater detail below. In some embodiments, the network 12 may be implemented on a physical layer in which signals may be sent between computing devices on the network on a physical media, in some cases across multiple hops, with intermediary computing devices disposed at each of the hops, in some cases relaying messages, for example, by routing messages through a mesh network. For example, in some cases, the physical layer may be an Ethernet network, a cellular network, or a WiFi™ network. In some embodiments, the network may include a plurality of computing devices 20 that communicate with one another or other networks via network elements 22, which in some cases may form a mesh through which network traffic is routed between computing devices and other networks. In some embodiments, the network elements 22 are network switches or routers, which in some cases may be configured to be remotely configured by a software defined networking controller 24.

In some embodiments, the computing devices 20 are desktop computers, laptop computers, tablets, smart phones, wearable computers, printers, faxes, scanners, or various Internet of things appliances, like smart televisions, media players, industrial controls actuators, industrial control sensors, autonomous drones, automobiles, and the like. In some embodiments, each of the computing devices 20 may include a network interface, such as a network interface card, configured to send and receive signals on a physical media, for example, signals encoding higher-level protocol packets routed by the network elements 22 in payloads of frames. In some cases, physical media may connect computing devices to one of the network elements via a full-duplex or half duplex, point to point or multi-drop, physical communication protocol. In some embodiments, each of the computing devices 20 may have an address on the physical layer network, such as a media access control (MAC) address on a physical layer network. Frames may carry a payload encapsulated with metadata, e.g., a header, that identifies MAC addresses of recipient devices on the physical media.

Payloads of frames may include network-layer protocol data structures, such as Internet Protocol packets having headers with sender and receiver Internet Protocol addresses (e.g., IPv4 or IPv6) on a network layer. These addresses may be carried through across multiple hops, while the sender and MAC addresses at lower-level protocols may change to reflect the sender and receiver of an individual hop.

In some embodiments, payloads of IP packets may contain transport-layer protocol data structures, like Transport Control Protocol (TCP) or User Datagram Protocol (UDP) packets. In some cases, headers or other metadata of these packets may port numbers of network hosts on the network between which packets are sent, along with error correcting or detecting codes. Headers may also include an order in which payloads of the packets are to be placed to reassemble higher-protocol-layer data, like encapsulated application-layer data.

In some embodiments, the computing devices 20 may be configured with an operating system that includes a network stack that conveys data between applications executing within the operating system and the network interface, for example, via a network driver in the operating system that interfaces with send and receive buffers on the network card via system memory accessed by network interface firmware via direct memory access. In some embodiments, the networking stack is configured to multiplex network communications received via a single network interface to a plurality of different applications according to respective network sockets defined by port numbers (and vice versa for sent data) and the Internet Protocol address of the respective machine, in some cases with different applications being registered in the operating system to send and receive data on different network sockets in the network stack.

In some embodiments, the network stack may be configured to encapsulate application-layer data according to various lower-level protocols, for example, segmenting application-layer data into a plurality of segments, placing headers on those segments that identify sender and recipient addresses in the physical layer network and networking-layer network, and queuing those encapsulated packets or frames in send buffers or reading those packets or frames from the receive buffers of a network interface.

Thus, in some cases, these lower-layer protocols may be nested within one another, for example, with application-layer data serving as a payload for a transport-layer packet, which serves as a payload for a networking-layer packet, which serves as a payload for a physical-layer frame. In some embodiments, when data is received, that data may be decapsulated to reassemble the application-layer data (or data at intermediate layers), which may be passed to a specific application executing on the computing device registered to a socket having a port number listed in an address in a header of one of the layers with which the data is encapsulated.

In some embodiments, the network elements 22 are configured to receive packets, for example by receiving a frame with a MAC address of the network element 22, decapsulating physical layer frames and accessing network-layer packets in payloads therein, and then determining where (e.g., one of several ports on the device coupled to other devices having other MAC addresses) to send that packet to form a next top and a path to a recipient address in a header of the network-layer packet. To this end, in some embodiments, the networking elements in some cases may include a plurality of physical-layer ports by which network elements may connect via physical media to other network elements or to computing devices, which is not to suggest that networking elements are not a type of computing device in some cases. In some embodiments, the network elements 22 may maintain and memory a IPTable, which may process inputs to form a forwarding table, by which an output port is selected responsive to a recipient address in a packet header received in another port. Respective forwarding table entries may map MAC addresses to physical ports of a network element that can be reached via physical media connected to that physical port. In some embodiments, these mappings are implemented with content addressable memory to facilitate relatively low latency forwarding of packets.

In some embodiments, these settings and other logic of the networking elements 22 may be characterized as a data plane in a software defined networking implementation like the network 12 shown in FIG. 1. In some embodiments, an agent executing on the networking element may receive instructions from the software defined networking controller 24 by which a control plane reconfigures the data plane, for example, by changing values in IPTables or forwarding tables, or other configuration settings. In some embodiments, these changes may include changing MAC addresses or Internet Protocol addresses designated as being reachable via identified physical ports of the networking element 22 connected to physical media, changing costs associated with different paths through the network or ports, and changing paths to other computing devices across the network. In some embodiments, a CDPI agent executing on the networking element may receive instructions to change these parameters from a CDPI driver executing in the software defined networking controller 24. In some embodiments, the IPTable instance or forwarding table of the respective networking element 22 may be configured to process a subset of relays handled by the network 12, for example, those for pairs of computing devices that have communicated with one another in the past. In some embodiments, the agent may, upon encountering a new sender-recipient pair, send a request to the CDPI driver of the software defined networking controller requesting a value to input into an IPTable instance, e.g., for a forwarding table entry, to determine which port to forward the respective packet to back onto the physical media. Further, in some embodiments, the CDPI agent may be responsive to queries from the CDPI driver on the software defined networking controller 24 to report back a current configuration of the networking element 22, such as a current configuration of an IPTables instance or forwarding table entries.

In some embodiments, the software defined networking controller 24 may be configured to dynamically reconfigure settings of the networking elements 24, such as those described above. For example, in some cases the software defined networking controller may include a northbound interface agent that receives instructions from various software defined networking applications by which these adjustments are made. In some cases, the network controller 14 is a software defined networking application having a driver described in greater detail below, operative to interface with the software defined networking controllers, for example, having a northbound interface driver configured to interface with a northbound interface agent in the software defined networking controller via a northbound interface. In some cases, the network controller 14 has a plurality of such drivers configured to interface with a heterogenous mix of software defined network controllers or VPN servers like those described with reference to FIG. 2. Thus, in some cases the network controller 14 may be operative to, via the software defined networking controller 24, change settings in IPTables and forwarding tables in the networking elements 22.

In some embodiments, these changes may further include prohibiting certain pairs of computing devices on the network 12 from communicating with one another or with various external networks or addresses (e.g., geographic regions, uniform resource locators, or Internet Protocol addresses) on external networks. In some embodiments, these modifications may include permitting such communications, or in some embodiments, these modifications may include enforcing a quality of service on such communications, for example, prioritizing some communications between designated pairs of computing devices, or rate limiting communications between designated pairs of computing devices, as descried in greater detail below.

In some embodiments, the network controller 14 is configured to execute a process described in greater detail below with reference to FIGS. 3-5 that provides a relatively user-friendly interface by which relatively technically unskilled users may exercise fine-grained control over permitted paths the data may take in the network 12. In some embodiments, the network controller 14 includes a view generator 26, an application program interface server 28, a graph driver 30, a web server 32, a network configuration agent 34, and a northbound interface driver 36. These components may communicate with one another via function calls, system calls, or message passing across a network or shared state.

In some embodiments, the view generator 26 is configured to form user interfaces like those described below with reference to FIG. 5. In some embodiments, the user interfaces may be formed for presentation on a computing device executing the network controller 14, or in some embodiments, the views that are generated may be in the form of instructions sent to a remote client computing device upon which the user interfaces are presented and from which user inputs are received. For example, some embodiments may be configured to send webpage markup instructions, scripting instructions, and styling instructions, along with various other resources like images, by which a webpage user interface is rendered on a client computing device, and from which user inputs are received. In other embodiments, a client computing device may execute a native application configured to interface with the network controller 14 to implement such a user interface. In some embodiments, a native application may communicate with the network controller 14 via the API server 28. Sending data by which such a user interface is at least partially configured in a native application on a client computing device constitutes a form of sending instructions to form a user interface. In some embodiments, instructions sent to a webpage in a web browser may be sent via the web server 32, which may receive inputs provided via the webpage user interface.

In some embodiments, the graph driver 30 may be configured to interface with a data repository storing a graph that encodes currently permitted network communications on the network 12 (e.g., program state of the network controller 14 driven to the network 12 configuration via the SDN controller 14) and various other attributes of such communications. In some embodiments, the graph driver 30 may write records to the network graph cache database 20 and the tamper-evident immutable data store 18 that update versions of a data structure like that described below with reference to FIG. 3, e.g., mirroring the data both in a low-latency data repository and a tamper-evident, immutable data repository. The stored data may include a graph data structure that encodes a configuration of the network, and in some cases adjustments to that configuration by a user via the below-described user interfaces. In some embodiments, the graph may have a plurality of vertices that each correspond to a computing device on the network, such as a computing device having a network-layer address or a computing device having a transport-layer address, such as hosts on a network defined by IP address and port number pairs. In some embodiments, some vertices of the graph may correspond to users, who may correspond to records with various settings to be applied to communications from computing devices where the user's credentials have been presented to log into that computing device. Or some embodiments may provide for credential-free user log-ins using techniques like those described in a patent application titled CREDENTIAL-FREE USER LOGIN TO REMOTELY EXECUTED APPLICATIONS, filed on the same day as this application, the contents of which are hereby incorporated by reference.

Thus, in some cases, networking configurations may follow a user from one computing device to another as a user attempts to operate other computing devices within the network 12. In some embodiments, edges of the graph may specify respective pairs of the vertices, e.g., respective pairs of computing devices, and have attributes associated therewith that define networking parameters applied to communications between the respective pair of computing devices, or computing devices operated by users corresponding to the vertices. Examples of attributes of edges include whether communication is permitted in a first direction, whether communication is permitted in a second (opposing) direction, or various other direction-specific attributes, such as a maximum amount of data communicated in a given direction within a specified duration of time, whether communication in a given direction to a designated port number is permitted, whether communication in a given direction in a given transport-layer protocol is permitted, whether communication in a given direction in a designated application-layer protocol is permitted, respective rates of permitted communication in designated transport-layer protocols or application-layered protocols in a specified direction, and various other attributes. In some embodiments, the rules described below with reference to the network controls engine 16 may be stored as attributes of these edges, where edge-specific rules are to be applied, for example, rules that pattern match to emails between particular users or between a given computing device and a given user.

In some embodiments, the network graph cache database 20 is a relatively low-latency database relative to the tamper-evident, immutable data store 18, but may be a lower-security database than the tamper-evident, immutable data store 18. In some embodiments, the network graph cache database stores a portion or all of application state of the network controller 14, and in particular a state of the network graph, with attributes like those described above, enforced by the network controller 14 via the software define networking controller 24. In some embodiments, the network-graph cache database 20 is a relational database or a noSQL, non-relational database, such as a document database or a keyvalue store. In some embodiments, records in the network-graph cache database 20 may be mirrored in the tamper-evident, immutable data store 18, thereby providing a relatively high-security, auditable record of the state of the network graph at any point in time historically, thereby deterring a threat actor from making a temporary change and then attempting to revert to a previous state to conceal their actions, as an in immutable record is expected to be created in the tamper-evident, immutable data store by which the threat actors actions are expected to be discovered, and in some cases detected in real time by the network controls engine 16 described below.

In some embodiments, the network controller 14 may include a northbound interface driver 36 configured to interface with the software define networking controller 24, for instance, a northbound interface agent executing at the software define networking controller 24, in some cases via a northbound interface. In some embodiments, the northbound interface driver 36 may be configured to instruct the software define networking controller 24 to control a networking element 22 to write an updated value to an IPTable instance or forwarding table that implements a change to the network graph, such as a change received from a user via a user interface supplied by the view generator 26 via the API server 28 or the web server 32.

Some embodiments may include a networking configuration agent 34 responsive to instructions from the network controls engine 16 described in greater detail below. In some cases, the network controls engine 16 may dynamically adjust the network graph by sending instructions to the network configuration agent 34, and the network control controller 14 may enforce those changes via the software defined networking controller 24 in the manner described above. For instance, the network controls engine 16 may detect a user sending an email that pattern matches to a codeword used to refer to a trade secret confidentially internally, and that the email is addressed to an external IP address. In response, the network controls engine 16 may send an instruction to the network controller 14 that causes the network controller 14 to instruct the sdn controller 24 to command network elements 22 connected by physical media to this user's computer to delete or block the user's computers MAC address in forwarding tables, thereby cutting the user off from the network.

In some embodiments, the network controls engine 16 provides an application program interface and graphical user interface by which users with relatively little training may automate adjustments to the network graph and various other permissions responsive to observed patterns in network traffic. In some embodiments, the network controls engine 16 provides a graphical user interface supported by a domain specific programming language by which various rules may be composed in a relatively intuitive fashion, and those rules may prescribe various actions responsive to various types of patterns detected in network traffic. In some embodiments, these patterns may span various layers of a protocol stack, ranging from application-layer content, down to patterns in the network layer or physical layer. Various examples of these patterns and responsive actions are described in greater detail below with reference to a process in FIG. 6 that may be implemented by some embodiments of the network controls engine 16, in some cases in cooperation with a graphical user interface described below with reference to FIG. 7.

In some embodiments, the network controls engine 16 includes a traffic ingest module 38, a decapsulation module 40, another decapsulation module 42, and several classifiers 44, 46, and 48 corresponding to content in different layers of a protocol stack, an enforcement driver 50, and a graphical user interface generator 52.

In some embodiments, the traffic ingest module 38 ingest a copy of all network traffic on the network 12, for example, by having a port on each of the network elements 22 or a chokepoint network element 22 (e.g., with a network tap) replicate and forward traffic to the controls engine 16. In some embodiments, the amount of network traffic may be relatively large, for example exceeding 1 Gb per second, 10 Gb per second, or 40 Gb per second or faster in some networks. In some embodiments, the network controls engine 16 may be configured to respond to patterns appearing in network traffic relatively quickly, for example, in real time, for instance within two seconds, within 500 ms, within 100 ms, or within 50 ms of a replicated instance of the network traffic reaching the network controls engine 16. In some embodiments, network control engine 16 may be configured with content addressable memory programmed to recognize patterns in various layers to respond relatively quickly, or some embodiments may process data pulled from a network interface card, in some cases via a driver executed by the operating system and placed directly into a processing pipeline in a graphics processing unit configured to process rules concurrently.

In some embodiments, the network controls engine 16 is configured to ingest network traffic and buffer that network traffic. Some embodiments may decapsulate the network traffic through multiple layers of a network protocol stack with the decapsulation modules 40 and 42. For example, the network traffic physical layer encapsulation may be decapsulated by the traffic ingest module 38 to produce network-layer packets, having headers with source and destination Internet Protocol addresses. In some embodiments, the decapsulation module 40 may be configured to decapsulate transport-layer protocol packets within payloads of Internet-Protocol packets, for example, to produce transport-layer packets with headers having sending and receiving ports, and in some cases sequence numbers. To expedite operations, some embodiments may filter out certain data in each of these feeds, for instance jettisoning payload data processed in another data feed. In some embodiments, the decapsulation module 42 may be configured to extract payloads from the transport-layer packets and, in some cases, place those payloads in an order specified by sequence numbers in headers of the packets, appending consecutive segments to reform application-layer content. In some embodiments, the application-layer content may be in a variety of different protocols, examples including simple mail transfer protocol (SMTP), file-transfer protocol, hyper-text transport protocol content, and the like. In some embodiments, the application-layer content may be encrypted, for example, with transport layer security or secure socket layer security. Some embodiments may decrypt this content and relay the content with an intermediary server like that described in a US patent application titled CREDENTIAL-FREE USER LOGIN TO REMOTELY EXECUTED APPLICATIONS, filed on the same day as this application, the contents of which are hereby incorporated by reference.

Thus, some embodiments, with modules 38, 40, and 42, may process ingested network traffic to produce a variety of different parallel data streams (or these data streams may be intermingled to maintain associations between data in different protocol layers) corresponding to different layers of a protocol stack. In some embodiments, these different streams may be input into the classifiers 44, 46, and 48, which may apply various rules, having different criteria, specifying different patterns to identify rules that are satisfied by the ingested network traffic feeds. Each of these data feeds may be characterized as an example of network traffic, despite some feeds not being at the network-traffic network protocol layer, for example, application-layer feeds (or a subset of an intermingled consolidated feed) are still an example of network traffic, when carried over network traffic flows.

Rules may take a variety of different forms. In some embodiments, rules may be encoded in a domain specific programming language by which a variety of fields are embedded between reserved terms in a syntax of the domain specific language. For example, some embodiments may specify a criteria as a regular expression, a greater than or equal to operation, a range, or the like (in some cases combined with Boolean operators), followed by an operator, such as the term "in", followed by a data source, such as one of the feeds from modules 38 through 42, or a subset thereof, such as in a particular type of protocol in one of those feeds, like TCP or UDP, or HTTP or SMTP. Some embodiments may then follow this by another operator, such as "than" that delimits an action to be taken if the criteria of the rule are satisfied. An example would be "If ['trade-secret name' in SMTP] then [quarantine MAC and log event]," which looks for a keyword ('trade-secret name') in emails and, in response to detecting the term, causes the user's computer's MAC address to be blocked in forwarding tables and the event to be recorded in the tamper-evident, immutable data repository. Responsive actions may take a variety of different forms, including those enumerated below with reference to FIG. 6. In some embodiments, these different rules may be loaded to the corresponding classifier identified by the data source specified in the rule, or some embodiments may operate a classifier that operates on data that spans protocol layers, e.g., supporting "and" Boolean operators for a criterion that pattern matches to application layer data and another criterion that pattern matches to a range of IP addresses. Or some embodiments may include a network of classifiers in which sequential layers are fully connected, such that a classifier in a first layer feeds into each classifier as a potential input in a next layer, whereby a second term of a Boolean operator may be evaluated. Some embodiments may apply classifiers according to a recursive parsing of a rule, for instance by parsing the rule into an abstract syntax tree and then traversing the tree in a depth-first or breadth first traversal during which classifiers are applied at various branches.

In some embodiments, criteria may reference outputs of another function, such as a predictive model trained on past network behavior of a given user, computing device, or protocol, or combination thereof. For instance, some embodiments may log network traffic and train a recurrent neural network or hidden Markov model to predict sequences of exchanges, e.g., with a model per unit of profiling (like a user/computing device/protocol combination). Some embodiments may then apply current network traffic to the model to determine when the sequences deviate from the model and are indicated by the model as having a low conditional probability given previous actions. In another example, some embodiments may cluster network traffic, e.g., with a density-based clustering algorithm, after vectorizing network traffic with vectors having parameters like sender or receiver address, port numbers, protocols, and keywords in application-layer content. Some embodiments may then determine whether subsequent network traffic falls within a cluster or qualifies as an outlier, for instance with DB-SCAN clustering. In another example, a classification tree may be trained on past network traffic to classify the sending unit of profiling (like a user/computing device/ protocol combination) based on a collection of corresponding vectors. Some embodiments may then convert later traffic into a vector and determine whether in inferred sender predicted by the model matches a sending unit of profiling. Classifiers may take as inputs scores indicative of confidents, mismatches, errors, or fitness from these models to detect anomalous behavior.

In some embodiments, the classifiers, either concurrently or consecutively, may apply these rules to the respective data feeds to determine which rules are satisfied. In some embodiments, the classifiers may execute an event loop in which a process cycles through the rules and processes each unit of data loaded into a buffer, such as a last in first out buffer at an input at each of the classifiers. Some embodiments may use a ring buffer to avoid buffer overflows. In some embodiments, a plurality of processes may process these rules concurrently, such as a distinct process corresponding to each rule for instance as may be implemented in a graphical processing unit or in a field programmable gate array or application specific integrated circuit configured to operate as one of the classifiers or subset thereof.

In some cases, each classifier may have a ring buffer having a pointer to where new data is to be written, and another pointer to where data is to be read. These pointers may be advanced as data is written and read. Some embodiments may maintain dual ring buffers for each data feed and a flag on each of the ring buffers indicating whether it is being processed by having rules applied or whether it is being processed by having obtained data feeds being buffered, such that data feeds may be buffered concurrently with application of rules to a previously loaded buffer. Some embodiments may toggle the flag back and forth, such that one buffer is being loaded while the other is being processed with network being data tested against the rules, in some cases relatively quickly after the network data is acquired in a manner that accommodates asynchronous operations on the networking side relative to synchronous operations on the side of the buffers where rules are applied.

In some embodiments, the classifiers 44, 46, and 48, may be configured to send a message, such as an interrupt, an event, a task added to a stack, a function call, a system call, or a network message, to the enforcement driver 50, upon a given rule being satisfied. The message may indicate the action to be applied and fields to be included in a logged record of the event.

In some embodiments, the classifiers may be configured to process network traffic periodically, for example, every 100 milliseconds every rule may be applied to every buffered unit of network traffic. In some embodiments, the classifiers may be configured to apply the rules upon a certain quantum of network traffic being received, such as an amount of data or a fully formed unit of network traffic, such as upon receiving a fully formed packet at a given layer of a protocol stack, or upon receiving a fully formed statement in an application layer protocol. In some embodiments, an input to the classifiers may include the output of a routine configured to generate an event, such as an interrupt handled by an interrupt handler of the classifier, which responds to the receive signal by applying the rules, upon determining that a unit of content has been received.

In some embodiments, the graphical user interface generator 52 is configured to generate and coordinate interactions with a graphical user interface like that described below with reference to FIG. 7. In some embodiments, the graphical user interface may be presented on a computing device that executes network controls engine, or on another computing drop device, for instance, another computing device executing a web browser and with which a web-based graphical user interface is presented, or upon another computing device in which a native application is presented that includes the graphical user interface and operates upon data supplied by the GUI generator 52. In some embodiments, the GUI generator 52 may be configured to present graphical user interfaces via the API server 28 or the web server 32 of the network controller 14.

In some embodiments, the network graph may be stored in the tamper-evident, immutable data store 18, for example, as serialized hierarchical documents, like XML or JSON documents in the documents repository 54, or in some embodiments these records may be stored in the database 56 of the tamper-evident, immutable data store. In some embodiments, the tamper-evident, immutable data store may include log data 52, documents 54, and database entries 56. In some embodiments, the tamper-evident, immutable data store may include the features of the data structure described below with reference to FIG. 8, and in some cases the records stored there may be segmented and distributed among several directed acyclic graphs having arrangements of cryptographic hash pointers as edges like those shown and described.

Further, in some cases, changes in configurations by the network controller 14, for example, effectuated responsive to API requests or requests received via a user interface, may be logged in the log data 52, thereby creating an immutable, tamper-evident record of the state of the network graph and causes of changes thereto that is expected to deter malicious actors, as their actions will be discovered in the virtue of the immutable nature of the log data. Further, changes to rules enforced by the network controls engine 16, and instances in which the rules are satisfied may also be logged in the log data 52, for example, as sequences of events associated with timestamps and context that describes users associated with the action, such as a user making a change, a geolocation of the user, an IP address of the user, a MAC address of the user, and a content of the data (such as a command) that rise to the logged event, such as the content of a change to the network graph, the content of network traffic that triggered a rule, or the like. In some embodiments, the network controller 14 may include a module by which the log data may be sorted, filtered, or otherwise arranged for relatively easy digestion by users in a graphical user interface, for example, formed with the view generator 26. In some embodiments, log data may be queried, for example, with a programmatically formed query, responsive to a rule being satisfied by in the network controls engine 16, for example, querying log data associated with a given user, computing device, application, pair thereof, or network element responsive to a rule having criteria satisfied by network traffic pertaining to one or more of these entities. As a result, some embodiments may then present an alarm dashboard in which alarms may be presented alongside log data relevant to troubleshooting the alarm, for instance, by the view generator 26.

Figure 2:
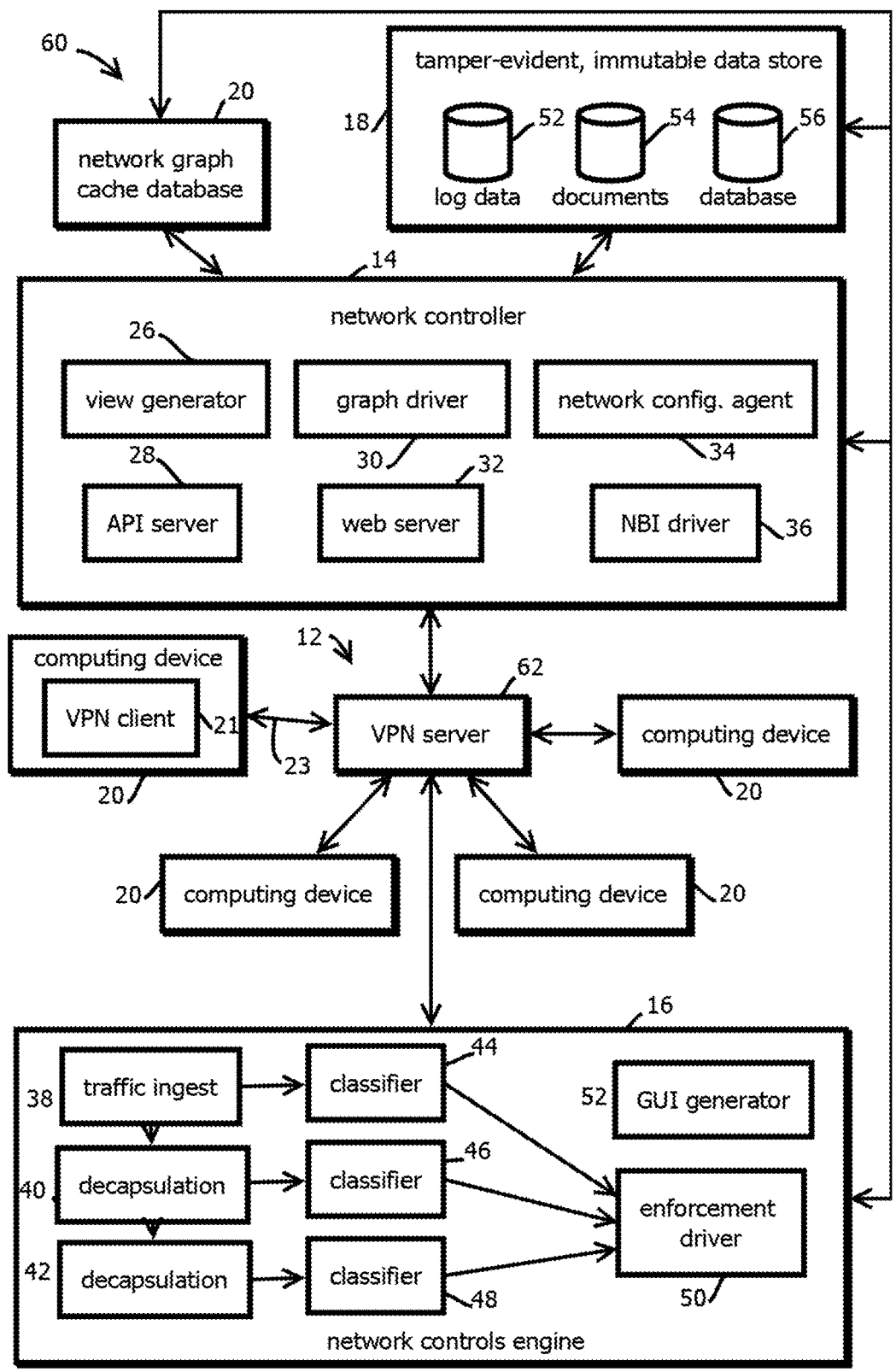
FIG. 2 is another logical and physical architecture block diagram that shows another example of a computing environment in accordance with some of the present embodiments.

FIG. 2 shows an example of a computing environment 60 having the features of the computing environment 10 described above, except that the network 12 has a VPN server 62 by which network connections are mediated, rather than a software defined networking controller 24. In some embodiments, these two types of networks may be combined, for example with VPN servers connected to network elements 22 of the software defined networking controller implemented network 12 of FIG. 1. In some embodiments, the VPN server 62 is configured to establish secure encrypted tunnels by which computing devices 20 have direct secure connections, in some cases tunneling through public networks, to one another. In some embodiments, the virtual private network is configured to provide a virtual private local area network service (VPLS), and in some cases may implement Multiprotocol Label Switching (MPLS), which in some cases, is configured in a manner in which paths are modified with techniques like those described above. In some embodiments, settings of the VPN server 62 may be adjusted in a manner like that described above to similar ends, e.g., prohibiting one VPN connection from sending data to another VPN connection via the server 62, which may serve the role of the network elements 22 above. Further, in some embodiments, the operation of the VPN server 62 may be monitored by the network controls engine 16, for instance, with data sent over the plurality of different virtual private networks with the different computing devices 20 being replicated and sent to the network controller 16 for pattern recognition and responsive action where necessary. In some cases, VPN management and the other network management techniques may extend upon related techniques described in U.S. patent application Ser. No. 15/171,347, titled COMPUTER SECURITY AND USAGE-ANALYSIS SYSTEM, the contents of which are incorporated by reference.

The client computing devices 20 may each be programmed with computer executable instructions stored within its memory to execute various applications and a VPN client application 21. The VPN client application 21 may be configured to interact with the counterpart VPN server 62 to establish a secure, encrypted communication channel 23 over a network, such as the public internet and various private networks, like local area networks, cellular networks, WiFi™ networks, and the like. In some embodiments, the counterpart to the VPN client application 21 is the VPN server 62, which may cooperate to form network 12 from one or more VPN connections 23. The VPN connections 23 may implement a private TCP/IP network 25 and the VPN server 62 may be a computer that has an assigned IP address on the VPN's private TCP/IP network. The VPN server 62 may also communicate with a suitable router or switch that provides connectivity between the VPN server 62 and the public internet.

In some embodiments, the VPN connections 23 and VPN server 62 may allow users regardless of geo-location to connect onto a single network (or some embodiments may impose geo-location criteria as a condition to access). Some embodiments of this VPN system may act as a proxy for a user computer's internet connection, e.g., forwarding all (or some) requests from the client machine 20 to the VPN server 62, and the VPN server 62 may then send the response back to the client machine (e.g., passing through content from third party websites or other servers, concealing the VPN address of the client, and public IP address of the client, from the third party server). In some embodiments, the traffic flowing between a user computer (client machine 20) and the VPN server 62 (e.g., all of the traffic) is encrypted using a suitable encryption protocol, such as AES-128-CBC, AES-256, or the like. This secure channel is expected to protect the user's traffic from anyone sitting in-between the user and the user's desired destination. This process is best understood in view of an example of its setup procedures.

The VPNs formed between the VPN server 62 and each computing device 20, in some embodiments, are based upon the open-source version of OpenVPN Access Server, running on a virtual CentOS 7 machine. The VPN server may be configured as a routed VPN and may or may not alter the domain-name system (DNS) entries of a client machine. The VPN server may be configured to not require a user supplied username or password to access the server. In some embodiments, the VPN server may be configured to instead use a combination of client/server certificates that are unique to each client/server and automatically push the client certificate's common name (CN) as the username to the VPN server. This is expected to allow one connection per client as well as be the basis for accessing the user's account (though other embodiments may permit more connections per client or use other bases for accessing user accounts). In some embodiments, the system may also create user groups by which one user may be associated with multiple devices, allowing for cross device authentication.

Additional configuration of the VPN server may provide tracking and accounting to monitor and identify each user on the system. In some embodiments, the illustrated system provides data logging and user tracking on the network, e.g., in records in the tamper-evident, immutable data store 18. In some embodiments, the VPN server 62 is configured to send authentication and accounting statistics to a separate, virtual, Radius server, which may then use a MariaDB database as data store, to store and process VPN data. Examples of such data may include but are not limited to (which is not to imply that any other described feature is limiting), the username, client public IP address, client internal IP address, connection time, number of bytes sent, number of bytes received, and in some cases, other connection specific parameters. Additionally, in some embodiments, the system may receive authentication requests from the VPN server 62, determine whether to permit a connection, and responds with a 'yes' or 'no' answer, telling the VPN server 62 whether to allow that client to connect. In some embodiments, the network accounting system uses, among other things, client certificate's common name (CN) and their public IP address to determine this yes/no answer.

In some embodiments, authentication may be based on the techniques descried in U.S. patent application Ser. No. 15/171,347, titled COMPUTER SECURITY AND USAGE-ANALYSIS SYSTEM, filed 2 Jun. 2016, or in the U.S. patent application titled CREDENTIAL-FREE USER LOGIN TO REMOTELY EXECUTED APPLICATIONS, filed on the same day as this application, the contents of both of which are hereby incorporated by reference.

In some cases, the VPN server may be configured to forward network traffic (e.g., all traffic) leaving the tunnel interface on port 80 to enter a transparent proxy listening on some arbitrary port. In some embodiments, the proxy used in the stack is the Squid proxy, configured as a transparent proxy in order to prevent any client side configurations. In some embodiments, the transparent proxy may be running on the same computer as the VPN server so that internal tunnel IP address can be seen by the proxy. In such implementations, this allows a lookup at the web server level to match an internal IP address to a VPN client CN.

The VPN client 21 (e.g., running on the client computing device 20) may connect to the VPN server 62. The VPN client may run on a user's client machine and may be responsible for connecting and communicating with the VPN server 62 for various types of network communication (e.g., all network communication). Additionally, in some embodiments, the VPN client receives and responds to requests during the authentication process. The VPN client may intercept network requests that the user makes on their machine, such as web site requests or email-related exchanges, and encrypt those requests using the provided AES key. The VPN client may re-route the request to the VPN server. In some cases, the VPN client may include a few server-specific items for connection and transmission. Each VPN client may be given a configuration file that includes the VPN server connection information, a set of VPN server/client unique certificates for use in establishing a secure connection, and an encryption key that the client uses when sending or receiving data to or from the VPN server. Each set of VPN server/client certificates may contain a VPN server certificate that was generated on the VPN server the client is attempting to access. The VPN server certificate may be unique to each VPN server and may serve as the basis for creating the unique client certificate that completes the server/client certificate pair. The client certificate may be created in the same way that an SSL (or TLS) certificate or SSH private key is created and may be unique to each machine that created it, making likely a very minimal amount collisions across the possible set of created certificates. In some embodiments, these uniquely created certificates are then stored securely on the VPN server 62. Once a client is requesting to download their VPN client software, in some embodiments, a process requests and receives the client certificate from the VPN server (e.g., without user intervention), adds the certificate to the VPN client executable, and places the client on a public facing, SSL secured, website for download.

Upon first running on a user's client machine 20, the VPN client 21 of some embodiments may register itself with a VPN authentication server, which may be the same or different from the VPN server 62. During normal operation, some such VPN clients may respond to authentication checks with unique, machine specific information in some embodiments. The VPN client 21 may communicate back to the PALS system, described in the applications incorporated by reference above, using an ABS-encryption client-unique keys and a rotating initialization vector, in some embodiments. The parameters of the cryptography function (e.g., AES) may be redefined at various times from the PALS server via a secure channel in some implementations. Additionally, the system may detect duplicate connection attempts as well as connections from areas that are anomalous to the user based upon their connecting IP address and prevent access for those connections. In some embodiments, the VPN client 21 may connect with the VPN serer 62 with the techniques described in the applications incorporated by reference above.

In some embodiments, the VPN client 21 may be configured to use client certificates, pass the common name of the client certificate as the username to the VPN server 62, and may be configured to alter DNS settings. Other embodiments may have other configurations, which is not to imply that any other feature may not be omitted or varied in some embodiments.

In some embodiments, an agent executing on the computing devices 20 at the edges of the network 12 may enforce the network graph rules. In some cases, an application executing in userspace of one of these, or a relaying computing device, may receiving routing instructions from the network controller 14 and enforce the specified constraints, e.g., a userspace program registered in an operating system to make packet routing decisions as an NFQUEUE controller.

In the examples above, four computing devices are shown, connected by either three network elements with one software defined networking controller or a single VPN server, but commercial implementations are expected to be substantially more complex, in some cases with more than 10, more than 100, or more than 1000 computing devices communicating across more than 5 or more than 50 instances of the above-described network equipment by which network traffic is routed between computing devices.

Figure 3:
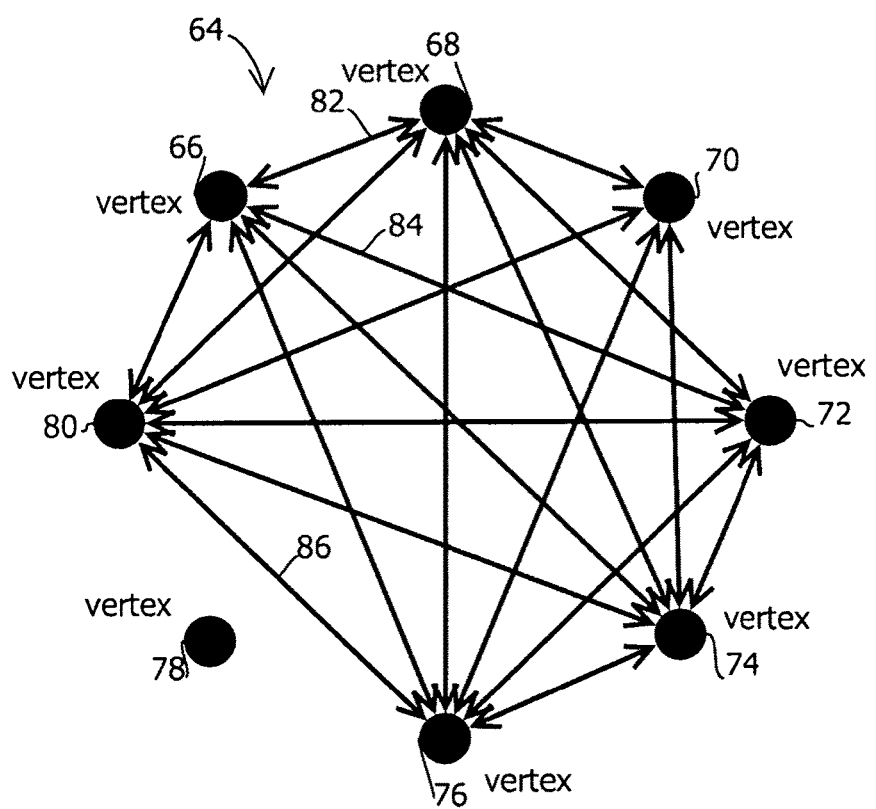
FIG. 3 shows an example of a graph data structure by which controlled attributes of a network may be stored and managed in accordance with some embodiments of the present techniques.

FIG. 3 shows an example of a network graph that may be stored in the network graph cache database 20 and operated on upon by the network controller 14 as a currently prescribed state of the network graph enforced by the network controller 14. In this example, the network graph 64 includes a plurality of vertices 66 through 80, each of which may correspond to a computing device or user logged into (or that is authorized to log into) a computing device on one of the above-described networks. In some embodiments, the network graph 64 includes a plurality of edges, such as edges 82, 84, and 86 by way of example. In some embodiments, each of these edges may have a variety of attributes, like those described above, that describe permitted or configured attributes of communication between computing devices or computing devices operated by users, corresponding to the vertices connected by the respective edge. For instance, edge 82 has as attributes aspects of communication between a computing device corresponding to vertex 66 and aspects of a computing device corresponding to vertex 68. Similarly, edge 84 has attributes that are aspects of communication like those described above between computing devices corresponding to vertices 66 and 72. The same pattern applies to edge 86, which describes attributes of communication between computing device corresponding to vertices 80 and 76.

It should be noted that a data structure need not be labeled as a graph in program code, and elements thereof need not be labeled as vertices or edges in program code, to constitute a network graph. Any data structure that encodes the corresponding information can serve as a graph, and such graphs may be encoded as associative data structures, key-value pairs, relational database entries, and objects state in an object-oriented programming environment, among other examples. The illustrated network graph 64 includes eight vertices, but commercial embodiments are expected to be substantially more complex. In some embodiments, the vertices may be organized with attributes of the vertices by which the vertices may be grouped, for example corresponding to subnet, department, hierarchy within an organization, job title where the vertices correspond to a user, or the like, and some cases with multiple attributes. Some embodiments may provide filters in a graphical user interface by which subsets of the vertices may be displayed or groups of vertices may be manipulated consecutively to make manipulation of network graphs by users more intuitive.

The computing environments above may implement one or more of the following techniques under the headings below.

High-Level Application Program Interface Wrapper for Software Defined Networking and Software Defined Access for Controlling Network Routing and Rules Application developers wishing to integrate network rule changes into their applications typically have had to work through SSH or console shells, write text files, save them to disk, and reload the rules for those networking devices. This process creates a number of potential error and corner conditions leading to large, device-specific, complicated and sometimes unmaintainable application code.

Some embodiments permit developers (including third party application developers) and C-Suite level personnel to easily deploy secure networking without the need for any network-specific programming knowledge, thereby reinstituting the balance of power within an organization. In some embodiments, this API allows for changing of network rules and also enables reporting, logging, and automated responses to network events. The API provided, in some embodiments, is a high-level hardware and implementation agnostic framework that is capable of Creating, Reading, Updating and Deleting the rules that define the access and auditing relationships between users on a network and devices on a network.

Some embodiments expose web-based endpoints that allow for the creation or destruction of an edge between two or more vertices. Edges and vertices, in some embodiments, are stored in a persistent data store, in some cases allowing for centralized access and management of a network-wide infrastructure from one interface. Each action through the API, in some embodiments, is reported into an immutable, persistent data storage blockchain as well as into a persistent data store (e.g., MySQL™ or MongoDB™). It is this blockchain storage, in some embodiments, that holds the records of network changes, as well as the results of each time a rule is tested (e.g., in some embodiments, when a user attempts to access a device, the result of that attempt is logged regardless of pass or fail).

These features, in the aggregate or in isolation, are expected, in some embodiments, to increase the amount of control and independence of less technically skilled executives seeking to manage or monitor their computer system. Using a trust-based system, the C-Suite relies on log files from an endless variety of systems that can be edited, changed, manipulated without record, providing a giant vulnerability within the organization. With the creation of blockchain technology, the ability to produce immutable records of the network and its traffic is now possible in some use cases, allowing for trust-less monitoring and management. That said, embodiments are not limited to implementations that afford all of these benefit, as various engineering and cost tradeoffs are contemplated, and multiple independently useful inventions are described.

Graphical User Interface for Software Defined Networking and Software Defined Access for Controlling Network Routing and Rules In today's sophisticated networking environment, complicated schemas and high levels of knowledge are often required to make modifications to rules, routes, and policies for a network. Traditional means of modifying text files through console or SSH sessions prevent those without specific knowledge from even attempting to control or modify these systems. This leaves complete control of the organization's core knowledgebase, including web traffic, email, instant message, voice, and general data, to the hands of those with little tie or allegiance to the C-suite and their liabilities.

Various "wizards" and other graphical user interfaces for configuring individual network components exist. For example, many wireless routers host a browser-based user interface by which the router may be configured by a user. But in many cases, these devices are not suited for enterprise-grade networks or the complexity that arises in those environments. At the other end of the spectrum, various software-defined networking tools exist that can configure networks, but these tools are typically difficult to use and configure other than for those with specialized training.

As a result, in many enterprise networks, business owners and key stakeholders often lack the ability to modify and view current network rules and permissions. Today, these people rely upon technology individuals and their integrity to execute these management tasks. The result is the balance of power between the C-suite and the IT staff is reversed.

Some embodiments are configured to create and respond to a graphical user interface that makes relatively sophisticated network configuration tasks intuitive. In some embodiments, the network is modeled as graph, in which nodes represent network resources (like servers, routers, switches, client computing devices, printers, and the like) and edges represent permissions between those resources (e.g., whether a client computing device has permission to send network traffic via a router), routes therebetween, and various related policies. In some embodiments, the graph may be displayed graphically, e.g., in a canvas element in a client-executed browser, and the user may drag and drop various visual elements to effect changes in the network configuration. Various depictions of the graph may be used, e.g., a force-directed layout, an arc diagram, a circular layout, layered graphs, and the like. Some embodiments may present the graph in a user interface that resembles FIG. 3 above or one of the user interfaces described below. In some embodiments, each visual element may be associated with an event handler (like code responsive to an on-click or on-touch event and a touch-release or click-release event) configured to take responsive action, e.g., sending instructions to a remote network device to effectuate requested changes.

Part 1: Data Relationships to GUI

Some embodiments create a graphical representation of network rules between users (or groups of users) and devices (or groups of devices), where each vertex on the graph represents a user or a device, and creates an edge between vertices where allowed access on the network is configured. By selecting a vertex, in some embodiments, users may visually drag and drop users or devices into the "allowed group," which creates the edges between vertices. Likewise, in some embodiments, users can drag and drop a user or device into the "unallowed group" to remove any edges between the vertices. This information may be stored in a persistent data store, in some embodiments, such as the tamper-evident, immutable data store described above. An example of such a graphical user interface is shown below, rotated in portrait form to enhance resolution:

Part 2: Data Relationships to SDN Commands for SDN Rules

In some embodiments, each edge in the network graph represents (e.g., has as an attribute) one or more of the following configurations, which may be applied to network elements, VPN servers, or other computing devices:

IPTables Rule on VPN server that permits (or prohibits) traffic flow between the two vertices;

IPTables Rule on one or both vertices that permits (or prohibits) traffic flow to and from another vertex;

Software-defined and persistently stored rule-set or relationship that is statefully inspected by a running NFQ controller on the VPN server;

Software-defined and persistently stored rule-set or relationship that is statefully inspected by a running NFQ controller on one or both vertices;

A rule or policy that can be produced by a third-party application to define or control access to a resource (API created rules); or A rule or policy that can be accessed by a third-party application to define or control access to a resource (API authentication).

In some embodiments, comma separated value (CSV) or other data serialization format (e.g., YAML, JSON, or XML) encodings of the rules can be uploaded to the switch (or other network element), manually created rules, and current switch/firewall GUIs have forms or other manual data entry techniques. Some embodiments can similarly open and edit text files and save them. Typically, only highly trained technologists are capable of or qualified to make these types of modifications. Further, changes made via the GUI may be logged to the immutable blockchain records described below, thereby deterring malicious actors (and even those with elevated privileges) from abusing their access. That said, embodiments are not limited to implementations that afford all of these benefit, as various engineering and cost tradeoffs are contemplated, and multiple independently useful inventions are described.

Figure 4:
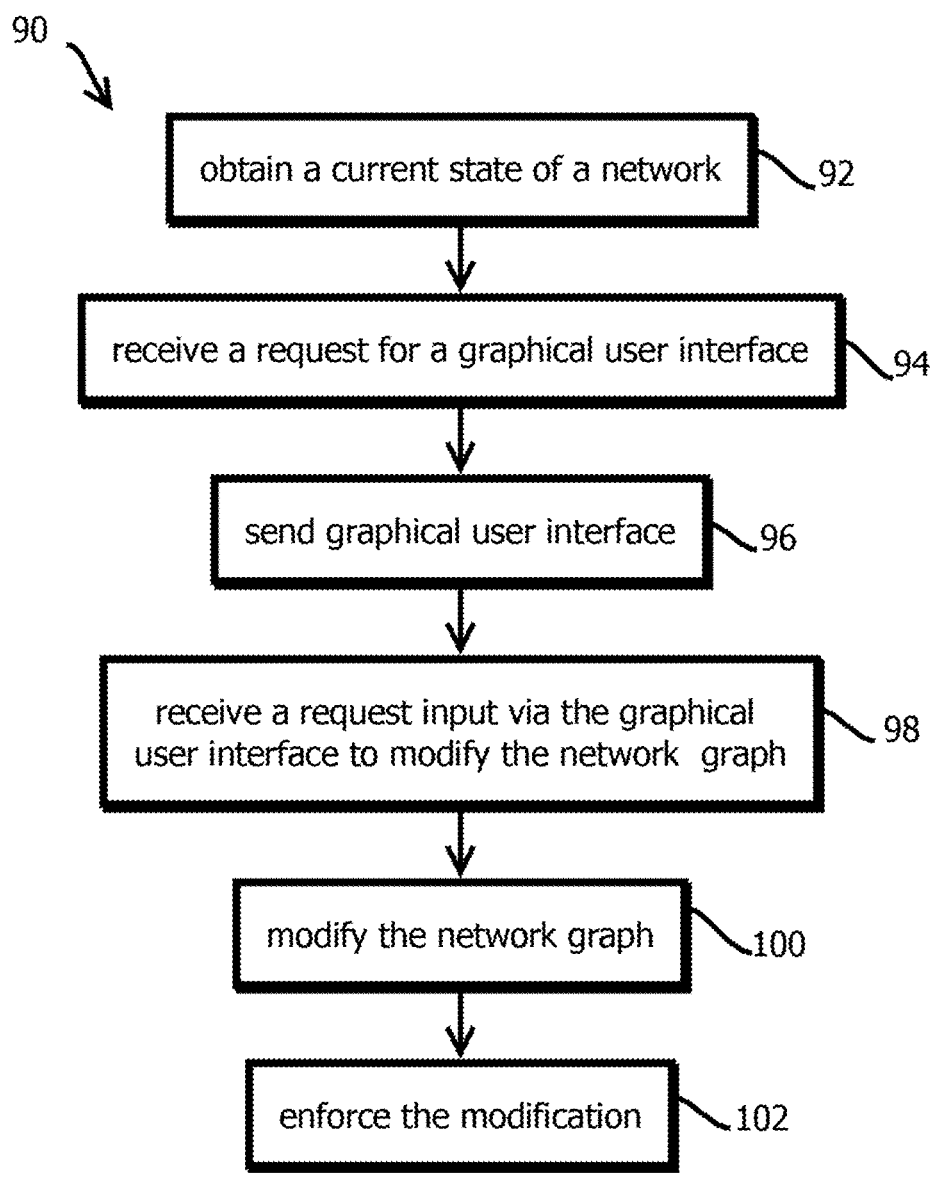
FIG. 4 is a flowchart that shows an example of a process by which a network may be configured in accordance with some embodiments of the present techniques.
Figure 5:
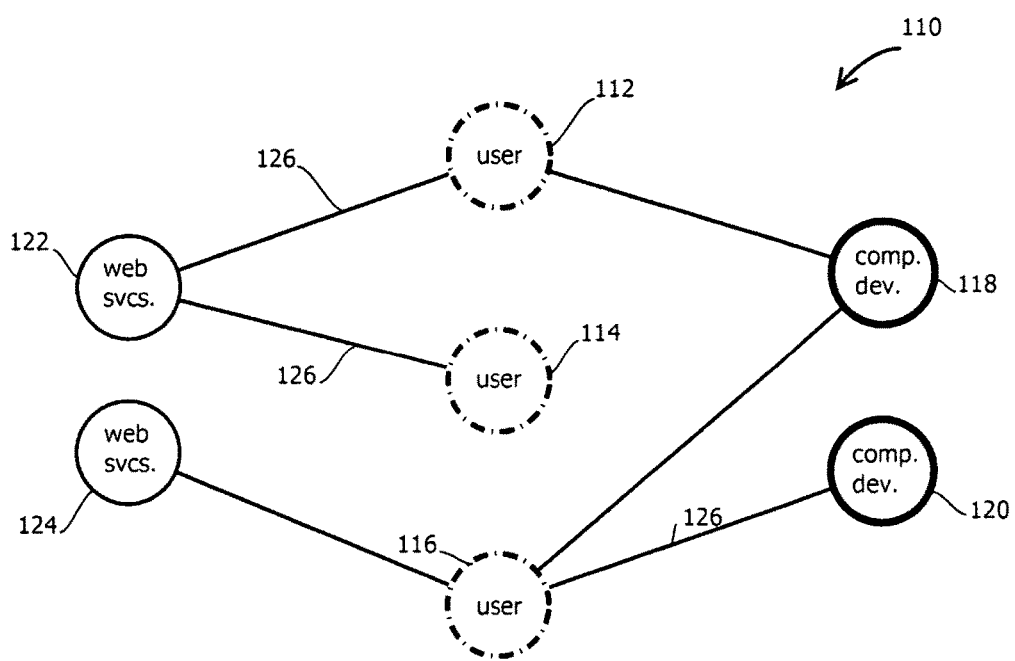
FIG. 5 is an example of a graphical user interface through which a user may interact with the process of FIG. 4 in accordance with some embodiments of the present techniques.

FIGS. 4 and 5 show a process and graphical user interface, respectively, by which the above techniques under the two preceding headings (and other techniques herein) may be implemented. In some embodiments, this process and the graphical user interface may be implemented with the above-described network controller 14, though embodiments are not limited to that implementation, which is not to suggest that any other description herein is limiting. In some embodiments, the instructions by which the processes are performed may be stored on a tangible, non-transitory, machine-readable medium (e.g., as program code), such that when the instructions are executed by one or more processors, the functionality described herein is effectuated. Notwithstanding the use of the singular term "medium," the instructions may be distributed with different subsets of the instructions stored (e.g., persistently or in dynamic memory) on different memories of different computing devices the execute the different subsets, an arrangement that is within the scope of the singular "medium" as used herein. In some embodiments, the order of the operations described may be changed. In some embodiments, operations may be omitted, operations may be inserted, operations may be replicated, the steps may be performed sequentially, or operations may be performed concurrently, as is the case with each of the processes described herein, none of which is to suggest that any other description herein is limiting.

In some embodiments, the process 90 of FIG. 4 includes obtaining a current state of a network, as indicated by block 92. In some embodiments, the current state may be obtained by querying the software defined controller 24 of FIG. 1, which may retrieve the state from the network elements 22 described above via the above-described drivers and agents, for instance, from forwarding tables or IPTables instances on those computing network elements. Or in some cases, the current state of the network may be obtained by querying the VPN server 62 described above for configuration settings that specify the attributes of the above-described network graphs. In some embodiments, network state may be maintained by the network graph cache database 20 and mirrored in the tamper-evident immutable data store 18. In some embodiments, the state of the network graph may be obtained by querying the network graph cache database 20. In some embodiments, this state may be compared with a state in the temper-evident immutable data store 18 to detect cases in which the network graph cache data base has been tampered with. In some embodiments, such a verification operation may be performed periodically or in response to one of the rules described above being triggered and indicating suspicious network activity.

As shown in FIG. 4, some embodiments, may further include receiving a request for a graphical user interface, as indicated by block 94. In some embodiments, the request may be a request received via a network for a graphical user interface like that discussed below with reference to FIG. 5, or in some cases the request may be received via input to a computing device executing the process 90 from a user, such as via a keyboard, touchscreen, or mouse input.

Some embodiments may then send the graphical user interface, as indicate by block 96, or otherwise cause the graphical user interface to be presented, for example, on the same computing device as is executing the process 90. Sending the graphical user interface may include sending markup or data by which a graphical user interface is constructed in a web browser or native application on a remote client device. In some embodiments, the communication with administrator client computing devices in which a user interacts with the graphical user interface may be sent via an out-of-band network or an in-band network, such as the network 12 described above by which data is shared between workload applications and various computing devices.

Some embodiments may receive a request input via the graphical user interface to modify the network graph, as indicated by block 98. In some embodiments, the graphical user interface may include scripting instructions that specify one or more event handlers mapped to one or more areas of a display screen, such as different areas of a web browser, in some cases associated with different types of actions within those areas, such as on click events, touch release event, touch events, drag and drop events, various (e.g., multitouch, or force sensitive) gestures, and the like. In some embodiments, those event handlers receive the event from the browser or operation system and, in response, may call included code that sends or otherwise calls a routine that perform subsequent operations with the context of the event, for instance, identifying one or more vertices or edges of the network graph to which the change applies and a content of the change, such as deleting the ability of computing devices or users to communicate, deleting the ability of user (e.g., a computing device into which the user has logged in) or computing devices to communicate according to a particular protocol, a greater than a particular rate, or some combination thereof. Other examples are described above with reference to the graph driver 30.

Some embodiments may receive this request and then modify the network graph, as indicated by block 100, in accordance with the request. In some embodiments, the request may be parsed to identify vertices or edges and attributes and changes, and some embodiments may input these values into a function configured to effectuate the change. In some embodiments, the function (e.g., in the graph driver 30) may call the network graph cache database 20 and instruct the database to effectuate the change, for instance, with a write command to a record associated with the settings being modified. In some embodiments, the modification may also be written to a version of the network graph stored in the tamper-evident, immutable data store 18, for instance, in a document in document repository 54, or records in database 56, and in some embodiments, the modification may be logged is an event in the log data 52 described above with reference to FIG. 1.

Some embodiments may further enforce the modification, as indicated by block 102. In some cases, this may include sending an instruction to the software defined networking controller 24 described above, for instance, via the North bound interface driver 36, or sending an instruction to the VPN server 62 commanding these entities to effectuate the change. In some embodiments, these changes may also be driven to a firewall or other gateway between computing devices to effectuate the changes. Sending an instruction that causes the modification to be enforced is an example of enforcing the modification, and an actor need not supply or operate the equipment that receives those instructions to engage in the act of enforcing the modification. In some embodiments, enforcing the modification includes modifying entries in IPTables instances or forwarding tables in the above-described network elements 22 or making changes to records in the VPN server 62 that indicate which VPN connections are permitted to have messages routed to which other VPN connections with the various computing devices 20, or otherwise applying the various settings described above in association with attributes of edges of the network graph.

FIG. 5 shows an example of a user interface 110 by which a network graph may be modified. As illustrated, the UI may include icons representing users (112, 114, and 116), computing devices (118 and 120), and web services (122 and 124). Edges 126 may be selected to modify attributes of communication between the corresponding entities connected by the edges.

Internal Controls Engine and Reporting of Events Generated by a Network or Associated Applications Typical enterprise networks and associated applications generate a continual stream of events that would typically be overwhelming for a normal human to process effectively. Business owners and key stakeholders lack the ability to effectively analyze and process these events. Today, these people rely upon technology individuals and their integrity to execute these management tasks. The result is the balance of power between the C-suite and the IT staff is reversed.

Some embodiments include an internal controls engine that gives visibility and actionability to individuals within an organization that would otherwise not have direct access to or control over this information.

Some embodiments include an internal controls engine (ICE) that allows a user through a graphical user interface to define a set of rules (e.g., including formulas, patterns, and the like) to identify out of bound events or network behaviors and define an appropriate course of action as a response to those events or behaviors whereas with many traditional systems, deep technical knowledge is required to access firewall or switch resources and programmatically make adjustments to running memories of such systems. Automated responses to certain actions can be easily configured through use of GUI or API to create and if-this-then-that system that before would have taken network and programming engineers in the past to realize. Additionally, changes to the internal controls system, as well as the generated responses, are logged to a blockchain, in some embodiment.

In some embodiments, the system works as follows: user inputs rules and actions associated with those rules. ICE constantly iterates over the inputted data in the immutable blockchain, checking against user-defined rules. If a piece of data triggers a rule's action, then ICE initiates that action. Types of input and log data can be seen below. Outputted actions can be anything from email notification to additional blockchain logs, to quarantining a user or even automatic shutdown of the system. Everything from user inputted rules, to creating actionable items, to reviewing the data may be exposed to an API that third party applications can access.

Sample user-defined rules:
Rate limiting of certain network events
Language filters for emails
Attempted access to defined sensitive data
Behavioral pattern recognition
Geolocation/geo-fencing Sample log inputs, which may be stored in the log data 52 above:
Network activity
Network changes
Emails
Email attachments
Application logging/syslog
ScatterDB access logs of access to the database 56
ScatterDB permission logs
ScatterFS access logs of access to the documents repository 54
ScatterFS permission logs
blockchain log viewing and downloading of data Sample automatic actions that can be taken in some embodiments:
a. Denial of Service (stopping the request completely)
b. Adding the requesting user or machine to a quarantine state
c. Limit the rate of access to some maximum number per time period
d. Inject latency into the response, where latency can be random or systematic
e. Register a callback function (e.g., a Webhook)
f. Report generation
g. Forced two-factor authorization
h. Notifications
   i. phone call
   ii. email
   iii. text message
   iv. page to pager Of note, in some embodiments, users can manually review log files from each independent network resource or application (e.g., via a user interface presented via the view generator 26), searching for suspicious activity. Users, of some embodiments, can similarly use plugins like Nagios™ or Splunk™ to aggregate log files for manual review; typically, these systems do not include automatic actionable responses.

In some embodiments, these and other techniques may be implemented with a process described below with reference to FIG. 6, in some cases using a graphical user interface described below with reference to FIG. 7. In some embodiments, these interfaces may afford a relatively intuitive and easy to use mechanism by which relatively high-level executives within an organization without technical training may monitor and enforce their security requirements within a network.

Figure 6:
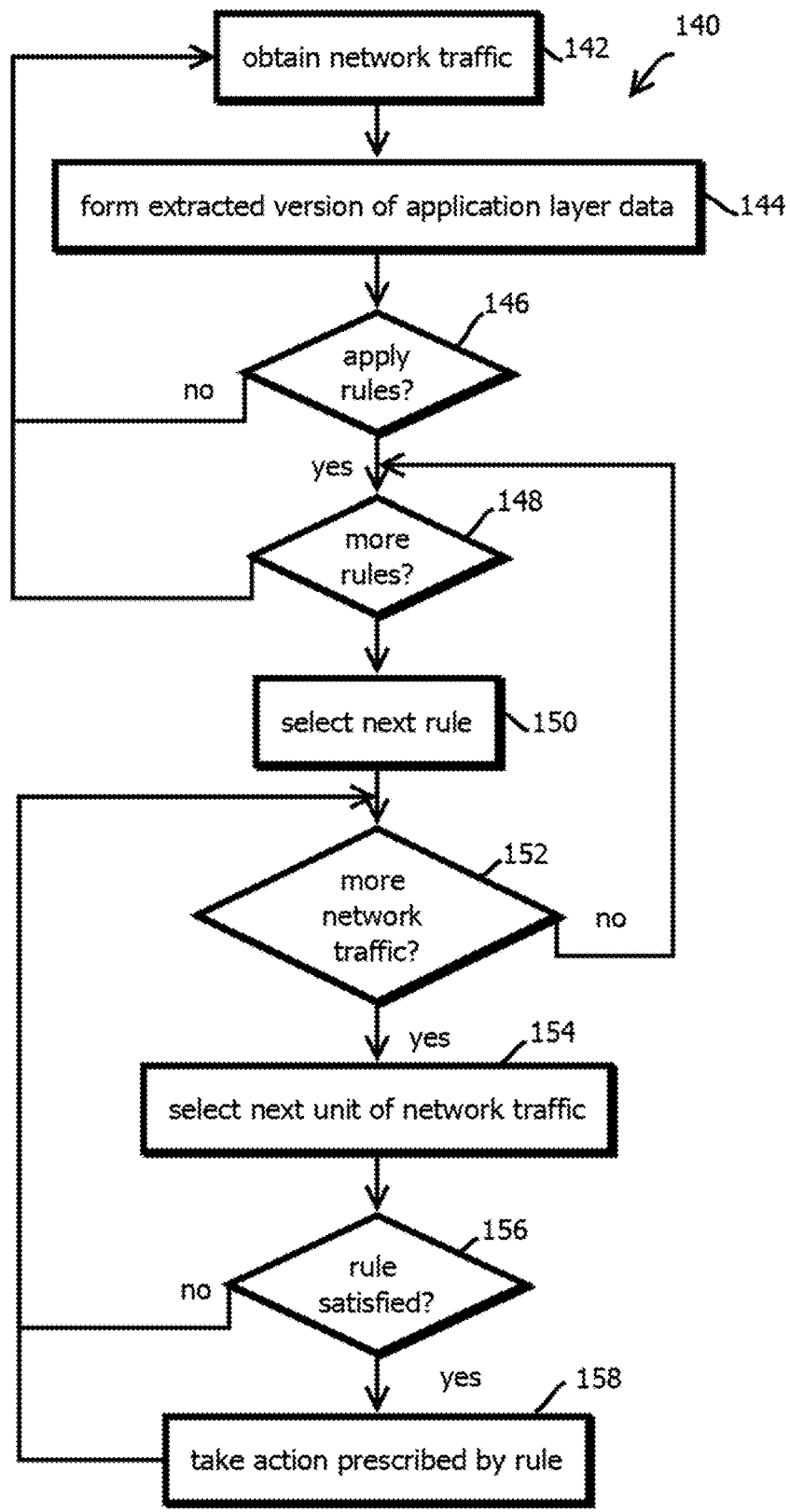
FIG. 6 is a flowchart that shows an example of a process by which rules for recognizing patterns in network traffic and taking responsive action may be implemented in accordance with some embodiments of the present techniques.

In some embodiments, the process 40 of FIG. 6 may be executed by the above-described network controls engine 16 of FIGS. 1 and 2, though embodiments are not limited to that implementation, which is not to suggest that any other description herein is limiting.

In some embodiments, the process 140 may include obtaining network traffic, as indicated by block 142. In some embodiments, network traffic may be obtained from a VPN server or from various network elements, like those described above. In some cases, a tap or other network element on a network may be configured to make a copy of all network traffic passing through the component on the network and advance that copy to the network controls engine or other application executing the process 140. In some embodiments, network traffic may be obtained encapsulated in a physical layer protocol or in a network layer protocol, in some cases with nested protocols in a protocol stack being applied, with addresses associated with the various protocols and identifiers of the various protocols in headers or other metadata associated with payloads at the various layers. In some embodiments, extracted versions at these different layers may be obtained, including forming an extracted version of application layer data, as indicated by block 144. In some embodiments, this operation may include the decapsulation operations described above with reference to FIG. 1. In some embodiments, this operation may produce several versions of data flows based on a single flow of network traffic, in some cases with the data rearranged in accordance with the various protocols, and in some cases stripping headers and appending payloads to reconstitute data at various layers of a protocol stack.

Some embodiments may determine whether a time has occurred to apply rules to one or more of these data feeds, as indicated by block 146. In some embodiments, rules may be applied to different ones of these data feeds at different times. In some embodiments, rules may be applied continuously, either in an event loop like that described herein, or with rules encoded in content addressable memory or in a field programmable gate array configured to signal the satisfaction of a rule, in some cases on each cycle of a system clock. In some embodiments, rules may be applied according to the various schedules described above with reference to the classifiers in the network controls engine 16. Upon determining that it is not time to apply the rules, some embodiments may return to block 142 and continue obtaining and extracting network traffic into one or more data feeds, in some cases populating a buffer, such as a first in first out buffer like those described above.

Upon determining that it is time to apply rules in block 146, some embodiments may apply the rules to buffered data, and in some cases to data buffered and a plurality of buffers corresponding to the different data feeds, such as data that has accumulated since the last time rules were applied. Some embodiments may proceed to determine whether there are more rules in a set of rules to be applied in block 148. Upon determining that all of the rules have been applied, some embodiments may return to block 142 and continue obtaining network traffic.

Alternatively, upon determining that there are more rules to apply, some embodiments may proceed to select a next rule to apply, as indicated by block 150. In some cases, this may include iterating through a list of rules and testing each of the rules against the respective data feed. In some embodiments, different data feed may be processed concurrently, in some cases different rules for a given data feed may be processed concurrently, in accordance with some of the techniques described above.

Some embodiments may then determine whether there is more network traffic to which the rule needs to be applied, for instance, whether the rule has been applied to each unit of network traffic in a given data feed in a buffer. Upon determining that the selected rule has been applied to all the network traffic in the buffer for the given data feed, some embodiments may return to block 148 and determine whether there are more rules to apply. Alternatively, upon determining that there is network traffic in the current buffer being process that has not been tested against the rule, some embodiments may select a next unit of network traffic, as indicated by block 154, in the respective buffer for the respective data feed. Some embodiments may then determine whether the rule is satisfied by the unit of network traffic, as indicated by block 156. In some embodiments, rules may have state, such as variables that accumulate values over time, like counters that count a number of units of content, such as packets, frames, bites, hypertext transport protocol request, or the like, over a trailing duration of time. In some embodiments criteria may reference these variables. And in some cases, rules may reference one another as criteria. Upon determining that the rule is not satisfied, and thus that no action is warranted, some embodiments may return to block 152 and determine whether there is more network traffic to process in the given data feed with the given rule currently selected. Upon determining that the rule is satisfied, some embodiments may take action prescribed by the rule, as indicated by block 158. In some embodiments, taking action may include the examples of taking action described above.

Some embodiments may then return to determine whether there is more network traffic to process with the currently selected rule in block 152.

FIG. 7 shows an example of a graphical user interface by which rules may be created, deleted, or otherwise modified. The graphical user interface is designed to make manipulation of these rules relatively simple for executives an organization who may be less comfortable with relatively Baroque rule definition schemas in intrusion detection systems. In some embodiments, the present techniques may be overlaid on traditional intrusion detection systems and other network configuration systems. In some embodiments, such systems may be configured to log adjustments in the tamper-evident, immutable data repository described above, thereby affording auditability, while providing another mechanism for higher-ranking employees to monitor activities and exercise a higher level of control.

FIG. 7 is an example of a user interface by which a rule is created or edited 180. As illustrated, users may configure various criteria, like triggers 182 and variables. Selecting triggers and variables may cause a configuration display 184 and 186 to be presented by which the items are configured, e.g., by defining filters or setting thresholds. Embodiments further include inputs to select responsive actions, such as an action 190 by which a user or device is blocked and an action 188 by which a user or device is placed in "quicksand," meaning that network actions are delayed and rate limited to avoid fully ceasing operations but limiting the amount of damage done while an alert is investigated.

Figure 8:
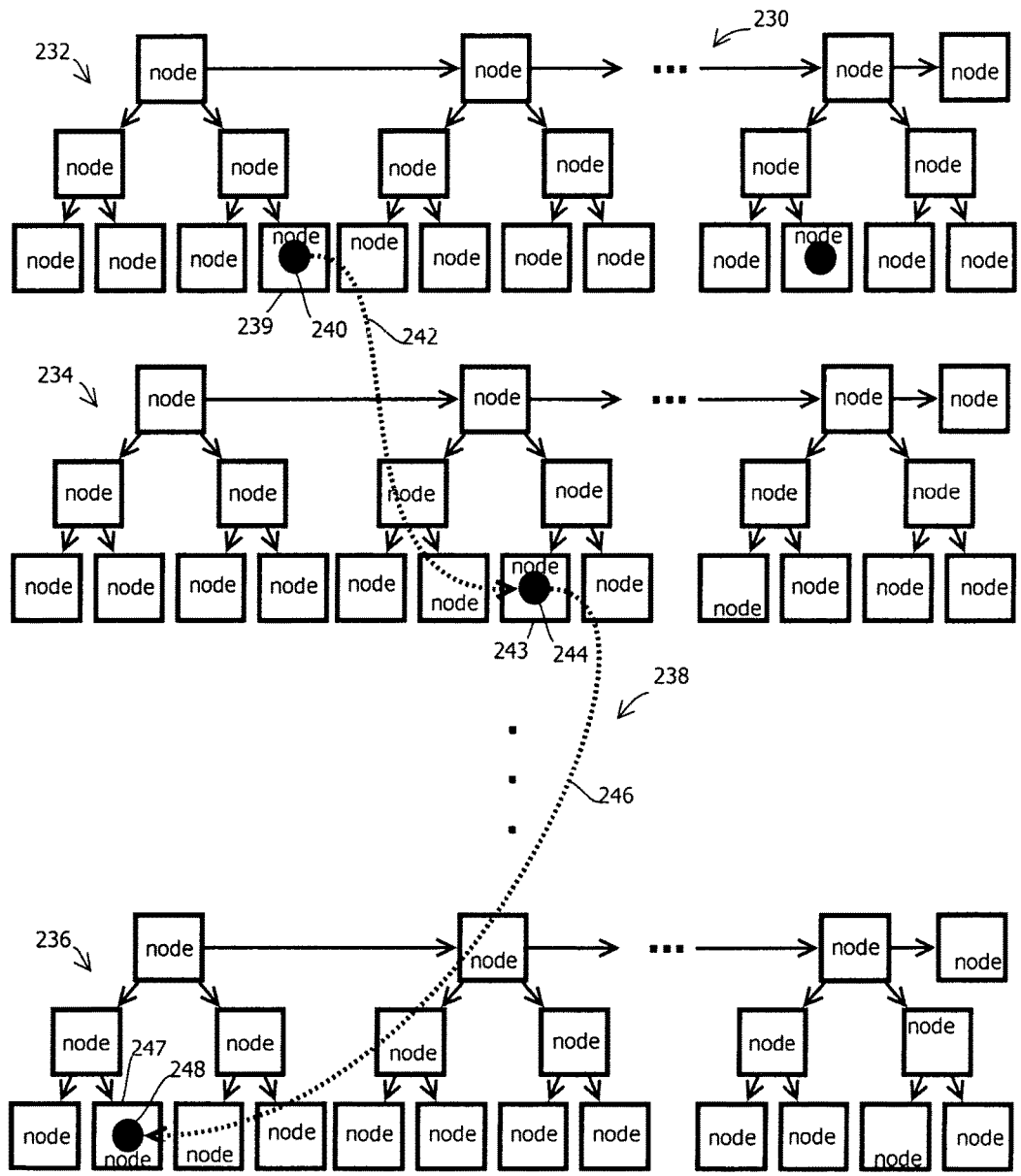
FIG. 8 is an example of a tamper-evident, immutable directed acyclic graph in which data from the above-described processes and systems may be stored in accordance with some embodiments of the present techniques.

FIG. 8 shows an example of a tamper-evident, immutable data repository formed with a data structure 230 in which a plurality of segments are stored in different directed acyclic graphs 232, 234, and 236, which in some cases may each have the features of the directed acyclic graphs described with reference to FIG. 3 in the patent application titled IMMUTABLE DATASTORE FOR LOW-LATENCY READING AND WRITING OF LARGE DATA SETS, filed on the same day as this application, the contents of which are hereby incorporated by reference. In some embodiments, credentials, log entries, network graph state, and records mapping permissions to users may be segmented, and the segments of a given value may be stored in a content graph overlaid on each of these directed acyclic graphs 232, 234, and 326, which may be characterized as a verification graphs to distinguish an overlaid content graph (and as they serve as an immutable tamper-evident log of the values of the segments in some embodiments).

In this example, the segments in the content graph 238 form a linked list, with a first node of the segment content graph 238 being stored in a leaf node 239 of verification graph 232, that first segment being designated as node 240 in the content graph. The node 240 in the content graph may be stored as an attribute in node content in the node 238 of the verification graph, and the content node 240 may include a pointer 242 to a next node in the content graph 238, which may be stored on a different verification graph 234. In some cases, the pointer 242 may be characterized as an edge in the content graph 238 and may be expressed as an identifier of a node 243 in the verification graph 234 or in some cases as an identifier of an attribute in that node where multiple segments are stored in different attributes of a given node of a verification graph. In some embodiments, in the content graph 238, node 240 points to another segment 244, which may then the point to another segment with pointer 246 in verification node 247 of verification graph 236. Verification node 247 may include as node content one or more attributes that specify a final segment in content graph 238 designated with element number 248. In some cases, node 148 may specify that there are no additional nodes in the value.

As a result, even if a given malicious actor somehow compromises one of the verification graphs 232, 234, or 236, that attacker will only be able to access a set of segments of values and will not have access to other segments needed to complete the full value. Further, because the segments are stored in a tamper-evident directed acyclic graph with the above-described hash point cryptographic hash pointers serving as edges/pointers, evidence of tampering will not be computationally feasible to conceal.

Thus, FIG. 8 shows a plurality of verification directed acyclic graphs 232, 234, and 236, each of which may be replicated, and each of which has nodes that may store as node content data that encodes a content graph 238, which in this case is a linked list of segments, where each segment in sequence points to the next segment and its corresponding address, and in some cases attribute identifier in the underlying verification graphs.

In this example, segments are arranged in a one-dimensional linked list, but embodiments are consistent with other arrangements of content graphs. For example, some segments may include pointers to multiple subsequent segments, for example, in a skip list to facilitate concurrent retrieval, and in some cases segments may be stored in association with a segment position identifier, for example, an order in which the segments are to be sequenced to reconstitute the segmented value in a read operation. In another example, segments in a content graph encoding a plurality of segments of an individual value may be stored in a binary tree content graph, a skip list content graph, or a combination of binary trees, linked lists, skip lists, and the like.

Three segments for a given value are shown, but embodiments are expected to include substantially more in some cases. In some cases, binary data encoding a single text character may be segmented, for example with a given Unicode character being segmented into two or more segments, and a given value yielding 10 or more or 20 or more segments, which in some cases may each be stored in different distributed acyclic graphs, which in some cases may each be replicated multiple times, for example 3 or more times. Thus, a given value may be stored in part on 30 different storage compute nodes. In some cases, different instances may be compared to determine an authoritative copy, e.g., selecting a stored and returned value according to a majority rule approach among the replicated instances. In some cases, e.g., where the replicated instances of the graphs are on permissioned computing devices, embodiments may vote for a given value without performing a proof of work or proof of storage operation, or where devices storing the graphs are untrusted, some embodiments may determine consensus with a proof of work, storage, or stake, e.g., according to a consensus protocol, like Paxos, Raft, or the like. In some embodiments, e.g., in untrusted systems, instances may be addressed according to Interplanetary File System (IPFS) or with various distributed hash table approaches.

In the example of FIG. 8, each of the directed acyclic graphs 232, 234, and 236 is the same type of directed acyclic graph, in this case a linked list of binary trees, where edges are formed by cryptographic hash pointers. In other embodiments, a heterogeneous set of directed acyclic graphs may be combined, for example with different segments stored in different types of graphs. For example, an initial segment may be stored in a binary tree, while other segments may be stored in directed acyclic graphs like those shown in FIG. 8, for example, in linked lists of binary trees.

Cryptographic hash pointers may be based upon a cryptographic hash function which may take a plurality of inputs, such as one or more node attributes and produce an output of fixed size. These functions may have pre-image resistance, second pre-image resistance, and collision resistance. Examples include an SHA-256, BLAKE, BLAKE2, SHA-1, SHA-2, and SHA-3 hash function. In some embodiments, the cryptographic hash function may be a one way function in which a given string of input produces deterministically a string of output that is relatively difficult or impossible to reverse to determine the input from the output while being relatively easy to confirm that an input corresponds to the output. For example, it may be computationally infeasible to identify a hash collision in which different instances of the input produce a given output. In some embodiments, the cryptographic hash function may implement the Merkle-Damgård construction.

In some embodiments, each binary tree in FIG. 8 may be characterized as a block (in a linked list of blocks) with a root node in a blockchain. In some embodiments, each of the arrows between blocks in the binary trees may also be cryptographic hash pointers, for example, based on an identifier of the node to which the cryptographic hash pointer points and a cryptographic hash value based upon node content of that node, which may include an attribute of that node that is itself a cryptographic hash value of another hash pointer. Thus, in some cases, a cryptographic hash value of a root node may be based upon node content of every node of the binary tree. In some embodiments, a root node may include three such cryptographic hash pointers, corresponding to six node attributes, the six attributes including three pairs of node identifiers and cryptographic hash values based on node content of those nodes. In some embodiments, node content may further include a cryptographic hash value based upon each of these values, or such a cryptographic hash value may be stored in another node that points to that node. The illustrated graphs are acyclic. As that term is used herein, it may refer to an acyclic subset of a larger cyclic graph. Thus, claims to acyclic directed graphs may not be avoided simply by adding an un-used cycle.

In some embodiments, the cryptographic hash function may be based upon a compression function that accepts a fixed size input and produces a fixed sized output with a one-way compression function. In some embodiments, because the input to the cryptographic hash function may be a variety of different sizes, the transformation may be performed in a variety of iteration and a plurality of iterations. Some embodiments may determine a length of input, such as a number of bytes, accepted by the one-way compression function, a length of output of the one-way compression function and determine a difference between these two lengths. Some embodiments may then parse an input to the cryptographic hash function into sequences of a size of this difference and iteratively input the parsed sequence into the one-way compression function and then combine the output of that iteration with a next portion parsed portion from the input, for example, incrementing from a beginning to an end of an input and iteratively concatenating, for example, prepending or appending or otherwise intermingling the output of the previous iteration of the one-way compression function with a next parsed portion of the input to the cryptographic hash function. Some embodiments may repeat this until an end of the input to the cryptographic hash function is reached (e.g., reaching a point within some threshold number of bytes or the last byte). In some embodiments, for example, where a plurality of inputs are applied, some embodiments may combine these inputs in a variety of approaches, for example prepending or appending or otherwise intermingling these inputs to form a string upon which these operations may be performed to produce a fixed sized output that is based upon the entirety of the input.

Automated Sensing of Network Conditions for Dynamically Provisioning Efficient Vpn Tunnels Often entities, like businesses, maintain private networks, such as local area networks, in which the entity is responsible for configuring the network. This is in contrast to many public networks, like the Internet, in which much of the network configuration tasks are outsourced. Local area (and other private) networks often include an address space, firewalls, routers, servers, clients, printers, fax machines, displays, and various network appliances.

VPN clients connect remote networks to local networks through the use of a client application for work or personal means. Under traditional circumstances, this involves routing of either certain or all network traffic through that connection in an encrypted fashion.

Generally, no automatic way to detect the most efficient and allowable method to establish VPN tunnel using known protocols. Because of the complexity of the modern day network, one set of static network settings (protocols, port numbers, transmission protocols, timeout latencies) may not work across the various networks a user encounters.

With some embodiments, the user may seamlessly traverse a relatively large number of potential settings optimized for their current network, regardless of condition.

Some embodiments deploy an algorithm inside of the client machine that constantly (or periodically, like more often than once every second) senses current network conditions (e.g., packet loss, latency, bandwidth) and optimizes (or otherwise improves) the client user experience by locating the best (or a better) set of VPN configuration options (e.g., ports, transport layer protocols, and VPN protocols) to provide the most seamless VPN tunnel experience for the end user. A centralized data store, in some embodiments, is utilized for known SSID/Geospacial networks such that the algorithm has a "last best known" starting point for establishing the most efficient tunnel connection. In some embodiments, a configuration may be selected based on a geographic distance (or network distance) between a current geolocation and a last best known configuration of a closest geolocation or network location. Some embodiments may improve upon the VPN configuration techniques described in U.S. patent application Ser. No. 15/171,347, filed 2 Jun. 2016, titled COMPUTER SECURITY AND USAGE-ANALYSIS SYSTEM, the contents of which are hereby incorporated by reference.

In some embodiments, a client computing device has a folder of static VPN configuration files and some embodiments manually iterate through these configurations to establish a connection. An example of different configurations might be the use of UDP packet transport over a more common UDP packet transport methodology; also the use of standard or non-standard ports has been shown to affect the quality of connectivity on publicly accessible networks.

Figure 9:
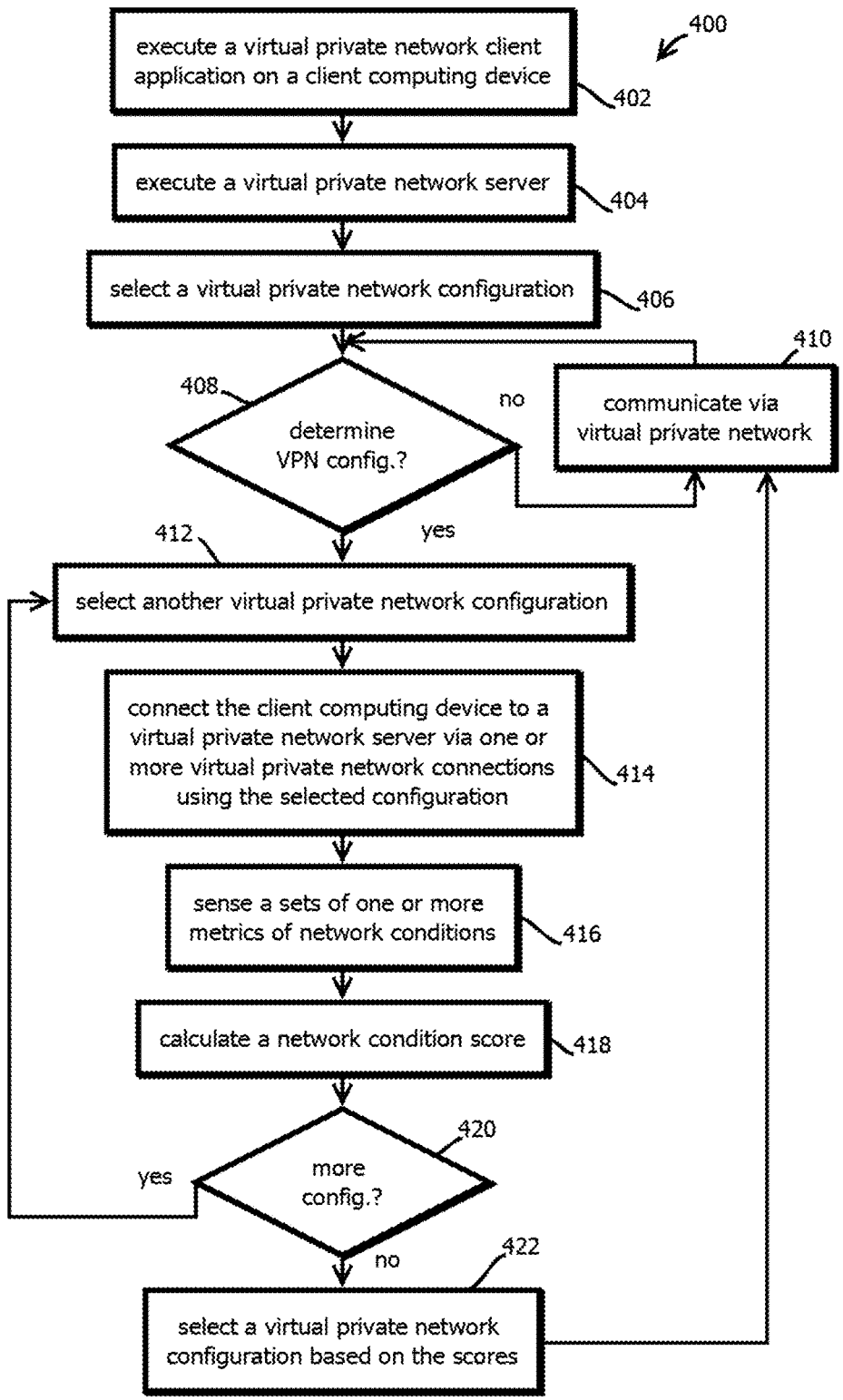
FIG. 9 is a flowchart of an example of a process to configure virtual private network connections in accordance with some embodiments of the present techniques.

In some embodiments, these or other techniques may be implemented with a process 400 shown in FIG. 9. In some embodiments, the process 400 may be executed by the above-described virtual private network client application 21 in cooperation with the virtual private network server 62, both described above with reference to FIG. 2. In some embodiments, the process 400 may be configured to optimize or otherwise improve configuration settings for a given connection between a given computing device and the virtual private network server, such as a point-to-point virtual private network. Or some embodiments may deploy these techniques to optimize configuration settings of a virtual private network local area network service like that described above. As noted, the configuration space is often relatively large, in many cases with more than 100 or more than 1000 or more than 10,000 different possible permutations of configurations for a given pair of sending and receiving Internet protocol addresses between which a virtual private network connection is established. Users may struggle with identifying appropriate, operative, or optimal configuration settings given the number of options available, and in many cases, network conditions may fluctuate, in some cases relatively rapidly, causing a given selection to become suboptimal or inoperative. Some embodiments may assist users by sensing network conditions and selecting settings for virtual private network connections responsive to sensed network conditions automatically. In some embodiments, the configuration settings may be set based on actions taken by the virtual private network server 62 or by the virtual private network client, or a combination thereof.

In some embodiments, the process 400 includes executing a virtual private network client application on a client computing device, as indicated by block 402. In some embodiments, this may include executing the above-described virtual private network client 21, discussed with reference to FIG. 2. In some embodiments, a plurality of such client applications may be executed on different ones of a plurality of different client computing devices, such as on each or a subset of the client computing devices on the network 12 described above, with different client computing devices establishing different virtual private network connections with the virtual private network server 62 discussed above.

Some embodiments may further execute a virtual private network server, as indicated by block 404, which in some cases may be executed by rack-mounted computing equipment in a data center, and some embodiments may execute a plurality of such servers. In some embodiments, a single virtual private network server may host virtual private networks with a plurality of computing devices over a plurality of different virtual private networks, in some cases more than 10, more than 100, or more than 1000. In some embodiments, a plurality of virtual private network servers may be connected to one another via a local area network, for example, in a data center, and may route messages between client computing devices on the different virtual private networks, or devices may connect via a shared virtual private network local area network service, for instance, using techniques like those described above with reference to the software defined networking hardware in FIG. 1, and in some cases being connected by that hardware.

Some embodiments may select a virtual private networking configuration for a virtual private network connection between the server and client, as indicated by block 406. In some embodiments, an initial set of configuration settings may be selected based on a last known good setting, such as a previously used setting stored in memory of the client computing device. Or some embodiments may store a plurality of different settings in a plurality of different profiles in memory of the client computing device. In some cases, profiles may be ranked according to the scores or metrics below, and some embodiments may select by incrementing through the ranking from best to worst. Some embodiments may select among those candidate profiles (or rankings thereof), each defining a configuration, based on various inputs to the client computing device. Examples include selecting a profile (or ranking) based on an SSID of a wireless area network to which the client computing device is connected, based on a MAC address of a router to which the computing device is connected, based on a geolocation of the computing device, based on a time of day, based on a cellular network carrier through which the client computing device is connecting, or the like. In some embodiments, the client computing device may exchange messages with the virtual private network server outside of the virtual private network connection, in some cases before, during, or after forming the virtual private network connection. In some cases, profiles or criteria for selecting profiles may be stored and accessed in local memory or in a remote data store shared across multiple client devices. For instance, if embodiments determine that a TCP/443 connection exhibits desirable metrics (e.g., works best) with "Starbucks" ™ access points, some embodiments may deploy that profile across other clients (e.g., all clients) operating with "Starbucks" ™ access points.

Some embodiments may then determine whether to reconfigure the VPN configuration, as indicated by block 408. In some embodiments, this determination may be made periodically, for example, every hundred milliseconds, every second, every 10 seconds, or every hour, or more or less often, depending upon trade-offs between overhead and responsiveness. In some embodiments, the determination may be based upon a network condition metric described below, for instance, responsive to one of the metrics satisfying a threshold, for instance, falling below a threshold or rising above a threshold corresponding to the respective metric. In some embodiments, the threshold may be a threshold for the below-described network condition score. In some embodiments, a user input via a graphical user interface may cause a virtual private network configuration to be re-determined. In some embodiments, the determination may be caused by a message from the virtual private network server, for instance, via a side channel communication outside a currently existing virtual private network connection or within such a virtual private network connection. Some embodiments may form a virtual private network connection with the selected virtual private network configuration of block 406, or at least attempt to form such a connection. In some embodiments, the determination a block 408 may be made responsive to a connection failing (or ceasing) to be established, for instance, responsive to the client computing device rejecting the configuration, the virtual private network server rejecting the configuration, or networking equipment rejecting the configuration.

Upon determining not to determine a new virtual private network configuration, some embodiments may continue to communicate via the virtual private network, as indicated by block 410. In some embodiments, this may include the client computing device sending or receiving encrypted messages over the public Internet and communicating with computing devices on a local area network with the virtual private network server as if the client computing device were locally present, or communicating via the virtual private network server with other computing devices, for instance, on other networks, for instance, on the public Internet. In some embodiments, communicating may include performing the below-described measurements by which metrics of network conditions are determined.

Alternatively, upon determining to reconfigure the virtual private network configuration, some embodiments may select another virtual private network configuration, as indicated by block 412. In some embodiments, virtual private network configurations may include any of the attributes described above, including client or server port numbers (e.g., an address ranging from 0 to 65535), transport layer protocols (e.g., UDP, TCP, Multipath TCP, SCTP, DCCP, RUDP, etc.), destination Internet Protocol address (e.g., a public address indicating that one VPN server among several is closer logically or geographically to the client device), and virtual-private network protocols (e.g., OpenVPN, Chameleon, Point-to-Point Tunneling Protocol (PPTP), Layer Two Tunneling Protocol (L2TP), or Secure Socket Tunneling Protocol (SSTP)). In some embodiments, each of these parameters may include a plurality of different options represented as different values for the parameter to which the parameter can be set in a given configuration.

In some embodiments, the selection is among a set of candidate configurations, for instance, in a list of profiles stored in memory of the client computing device, where those profiles have been determined to work in the past, in some cases conditional on (and then selected based on) a current environment (e.g., geolocation, network, network type) of the client computing device. In some embodiments, the selection is made by incrementing one parameter to a different option within a set of candidate options, while leaving other parameters unchanged. In some embodiments, the selection is made by randomly (or according to a list) selecting options for each of the parameters. In some embodiments, the selection is made in a manner configured to systematically explore a parameter space of candidate configurations, for instance, every permutation of every option may be tested with a brute force process in which a next candidate among the possible options of the parameter space may be selected.

In some embodiments, the selection be may be made according to an optimization algorithm that systematically selects candidate configurations. For example, some embodiments may execute a greedy optimization algorithm that optimizes one parameter at a time, for example, selecting different values for a given parameter among the options for that parameter until a best or satisfactory, as determined with the techniques below, setting for that parameter is determined, while holding other parameters constant. In some embodiments, the selection may be made with the brute force approach above. In some embodiments, some parameters may be optimized with the brute force approach, while others may be satisficed. For example, some embodiments may vary values of a parameter until a threshold score or metric of network conditions is satisfied, even though potentially other options may be better, while other parameters may be optimized, for instance, by testing every permutation or option of that parameter. In some embodiments, each of the network parameters may be determined by satisficing, for example, exploring a parameter space of configurations with a brute force approach, for instance, randomly, until a network condition score like that described below satisfies (e.g., is greater than, greater than or equal to, less than, or less than or equal to, depending on the sign of the metric/score) a threshold, or until a subset or each of the metrics of network conditions satisfy respective thresholds.

Some embodiments may connect the client computing device to the virtual private network server via one or more virtual private network connections using the selected configuration, as indicated in block 414. Some embodiments may establish a plurality of parallel virtual private network connections with the virtual private network server or another virtual private network server with a given client computing device, and some embodiments may test the selected set of configuration settings on one of the virtual private network connections while continuing to exchange workload data from applications executing on the client computing device with the other virtual private network connection. Or some embodiments may test a plurality of different configuration settings selected with the techniques described above on the different virtual private network connections concurrently. Or some embodiments may evaluate different selected virtual private network connection settings one at a time on a single virtual private network connection, which in some cases may include consecutively formed, broken, and then reformed virtual private network connections with different settings applied, an implementation consistent with reference to a single virtual private network connection.

Some embodiments may sense a set of one or more metrics of network conditions, as indicated by block 416, via the configured virtual private network connections from block 414. In some embodiments, this may include sending, receiving, or both sending and receiving test data between the client computing device and the virtual private network server via the virtual private network connection having the settings selected in block 412. Or in some cases this may include sending and receiving data from applications executing on the client computing devices with non-test network communications arising from regular usage of the client computing device. A variety of different metrics may be sensed, examples include packet loss, latency, bandwidth, usage of error correction codes, disordering of transport-layer packets from the assembled sequence, or the like. In some cases, the metrics may be aggregate measures based on these quantities over time, e.g., a measure of central tendency (like a mean, median, or mode) or a measure of variation (like a max, min, standard deviation, variance) over a trailing amount of data, like a previous 100 packets or kilobytes, or a trailing duration of time, like in the previous 100 milliseconds, second, minute, hour, or less or more.

Some embodiments may compare each of these metrics against a threshold to determine whether the virtual private network connection settings are acceptable, or some embodiments may calculate a network condition score based on these metrics, as indicated by block 418. In some embodiments, this may include calculating a weighted sum of the various metrics, calculating a value that nonlinearly combines these metrics, for instance, with a function that weights metrics below a threshold amount substantially more heavily than those above the threshold amount.

Some embodiments may then determine whether there are more configurations to evaluate, as indicated by block 420. In some embodiments, this may include determining whether the metrics or score satisfy the types of criteria described above with reference to block 408, for instance, with a satisficing approach by which exploration of the parameter space ceases once an adequate configuration has been identified. Or some embodiments may execute an optimization approach by which the parameter space is systematically or randomly explored, e.g., through a predetermined number of configuration settings or until a minimum or maximum is reached. Upon determining that there are more configuration settings to evaluate, some embodiments may return to block 412 and select another virtual private network configuration.

Alternatively, upon determining that there are no more configuration settings to explore, some embodiments may select a virtual private network configuration based on the scores, as indicated by block 422. In some embodiments, this may include identifying a highest scoring (or lowest scoring, depending upon signs used) network condition score and applying the virtual private network configuration settings in place when that network condition score was measured. In some embodiments, this may include continuing to operate with a currently connected virtual private network connection, for instance, when the above-describe satisficing approach is used. Some embodiments may then continue to communicate via the virtual private network, as discussed above with reference to FIG. 410.

In some embodiments, messages sent over the virtual private network, configuration of a network including the virtual private network, and alerts detected with the techniques described above, may be logged to the above-described tamper-evident, immutable data store, for instance, in the tamper-evident, immutable data repository 18, in accordance with the techniques described above. Further, in some cases, a credential, or cryptographic hash value based on that credential, by which a user accesses the virtual private network may be stored in the above-described tamper-evident, immutable data store 18 of FIGS. 1 and 2.

Figure 10:
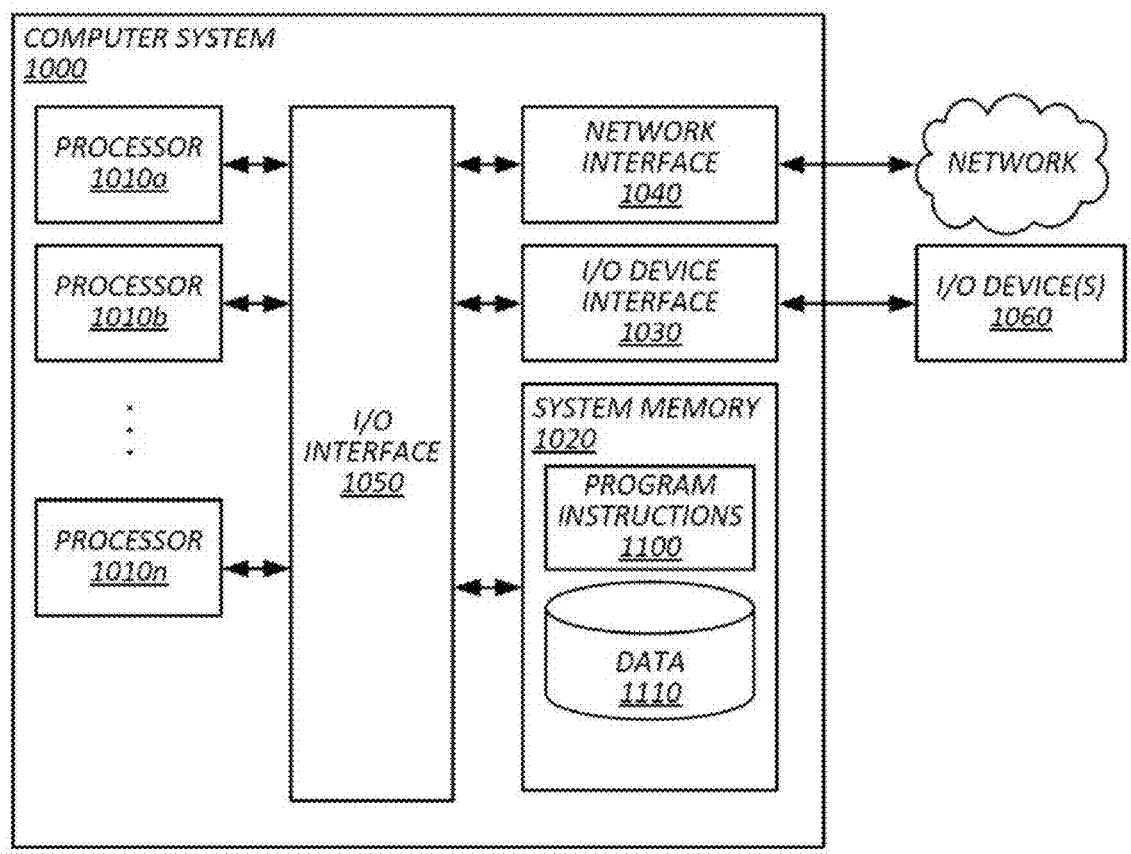
FIG. 10 is an example of a computing device by which the above processes and systems may be implemented in accordance with some embodiments of the present techniques.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: executing, with one or more processors, a virtual private network client application on a client computing device; connecting, with one or more processors, the client computing device to a virtual private network server via one or more virtual private network connections, wherein: the one or more virtual private network connection each form an encrypted tunnel between the client computing device and the virtual private network server; the one or more virtual private network connections apply different respective sets of configuration settings to configure the respective virtual private network connection; the different respective sets of configuration settings are applied concurrently on different virtual private network connections, on the same virtual private network connection at different times, or both; the different respective sets of configuration settings each include a plurality of different adjustable parameters by which virtual private network connections between the client computing device and the virtual private network server are configured; and each of the parameters takes a different value between at least one pair of the different respective sets of configuration settings; communicating or attempting to communicate, with one or more processors, between the client computing device and the virtual private network server via each of the one or more virtual private network connections while the different sets of configuration settings are applied; sensing, with one or more processors, a plurality of sets of one or more metrics of network conditions of the one or more virtual private network connections during communicating or attempting to communicate while the different sets of configuration settings are applied; selecting, with one or more processors, a set of configuration settings from among the different respective sets of configuration settings based on the plurality of sets of one or more metrics; and communicating, with one or more processors, between the virtual private network server and the client computing device with a virtual private network connection configured with the selected set of configuration settings, wherein: virtual private network connection settings are automatically configured based on sensed network conditions.

2. The medium of embodiment 1, wherein: the different respective sets of configuration settings each include more than three different adjustable parameters by which virtual private network connections between the client computing device and the virtual private network server are configured; and each of the variable parameters has three or more different respective options among the different respective sets of configuration settings.

3. The medium of any one of embodiments 1-2, wherein: the virtual private network connection settings are automatically configured based on sensed network conditions within a parameter space of more than 20 different permutations of configuration settings; and subsequent connections are initialized to a last-used connection stored in memory.

4. The medium of any one of embodiments 1-3, wherein: the virtual private network connection settings are automatically configured based on sensed network conditions within a parameter space of more than 10,000 different permutations of configuration settings.

5. The medium of any one of embodiments 1-4, wherein: a plurality of different virtual private network connections are formed concurrently between the client computing device and the virtual private server and a plurality of different sets of configuration settings are tested concurrently.

6. The medium of any one of embodiments 1-5, wherein: the virtual private network client, the virtual private network server, or both, are configured to iterate through different ones of the configuration settings until sensed metrics of network conditions satisfy a threshold.

7. The medium of any one of embodiments 1-6, wherein the virtual private network client, the virtual private network server, or both, are configured to: iterate through different ones of the configuration settings; calculate respective network condition scores based on the sensed metrics of network conditions; and select the set of configuration settings based on a set of configuration settings producing a highest or lowest score.

8. The medium of any one of embodiments 1-7, wherein: the sensed network conditions include metrics indicative of two or more of the following: ability to communicate any data, packet loss, latency, or bandwidth.

9. The medium of any one of embodiments 1-8, wherein: the sensed network conditions include metrics indicative of each of the following: ability to communicate any data, packet loss, latency, and bandwidth.

10. The medium of any one of embodiments 1-9, wherein: the plurality of different adjustable parameters of each set of configuration settings comprise at least two of the following: port number, transport layer protocol, or virtual private network protocol.

11. The medium of any one of embodiments 1-10, wherein: the plurality of different adjustable parameters of each set of configuration settings comprise each of the following: port number, transport layer protocol, and virtual private network protocol.

12. The medium of any one of embodiments 1-11, wherein: the virtual private network server is configured to concurrently participate in virtual private network connections with more than 256 different computing devices.

13. The medium of any one of embodiments 1-12, wherein: the adjustable parameters are optimized one at a time with greedy optimization algorithm.

14. The medium of any one of embodiments 1-13, wherein: the adjustable parameters are optimized with a brute force search of every permutation in a parameter space of the adjustable parameters.
15. The medium of any one of embodiments 1-14, wherein the operations comprise: storing a security credential, or cryptographic hash value based on the security credential, by which the client computing device is authenticated to the virtual private network server in a tamper-evident, immutable data repository.
16. The medium of any one of embodiments 1-15, wherein the operations comprise: logging data descriptive of at least some communication between the virtual private network server and the client computing device in tamper-evident, immutable data repository having a directed acyclic graph with edges defined at least in part by cryptographic hash pointers.
17. The medium of any one of embodiments 1-16, wherein the operations comprise: receiving a request with a network controller to quarantine the client computing device or a user of the client computing device; and in response to the request, communicating a message between the network controller and the virtual private network server that causes the virtual private network server to prevent least some communications from the client computing device from reaching a destination network address.
18. The medium of any one of embodiments 1-17, wherein the operations comprise: applying a plurality of rules with an internal controls engine to network traffic from the client computing device communicated via the virtual private network connection configured with the selected set of configuration settings; and detecting that the network traffic satisfies criteria of a given rule and, in response, effectuating an action specified, at least in part, by the given rule.
19. The medium of any one of embodiments 1-18, comprising: executing an operating system on the client computing device; executing an operating system on the virtual private network server; communicating via a local area network; and executing a plurality of enterprise software applications accessed via the virtual private network connection formed with selected set of configuration settings.
20. A method, comprising: the operations of any one of embodiments 1-19.
21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
   executing, with one or more processors, a virtual private network client application on a client computing device;
   connecting, with one or more processors, the client computing device to a virtual private network server via one or more virtual private network connections, wherein:
      the one or more virtual private network connection each form an encrypted tunnel between the client computing device and the virtual private network server;
      the one or more virtual private network connections apply different respective sets of configuration settings to configure the respective virtual private network connection;
      the different respective sets of configuration settings are applied concurrently on different virtual private network connections, on the same virtual private network connection at different times, or both;
      the different respective sets of configuration settings each include a plurality of different adjustable parameters by which virtual private network connections between the client computing device and the virtual private network server are configured; and
      each of the parameters takes a different value between at least one pair of the different respective sets of configuration settings;
   communicating or attempting to communicate, with one or more processors, between the client computing device and the virtual private network server via each of the one or more virtual private network connections while the different sets of configuration settings are applied;
   sensing, with one or more processors, a plurality of sets of one or more metrics of network conditions of the one or more virtual private network connections during communicating or attempting to communicate while the different sets of configuration settings are applied;
   selecting, with one or more processors, a set of configuration settings from among the different respective sets of configuration settings based on the plurality of sets of one or more metrics;
   communicating, with one or more processors, between the virtual private network server and the client computing device with a virtual private network connection configured with the selected set of configuration settings; and
   logging data descriptive of at least some communication between the virtual private network server and the client computing device in tamper-evident, immutable data repository having a directed acyclic graph with edges defined at least in part by cryptographic hash pointers, wherein:
      virtual private network connection settings are automatically configured based on sensed network conditions;
      a plurality of different virtual private network connections are formed concurrently between the client computing device and the virtual private server and a plurality of different sets of configuration settings are tested concurrently;
      the virtual private network client, the virtual private network server, or both, are configured to:
         iterate through different ones of the configuration settings;
         calculate respective network condition scores based on the sensed metrics of network conditions; and
         select the set of configuration settings based on a set of configuration settings producing a highest or lowest score;
      the sensed network conditions include metrics indicative of each of the following: ability to communicate any data, packet loss, latency, and bandwidth;
      the plurality of different adjustable parameters of each set of configuration settings comprise each of the following: port number, transport layer protocol, destination address, and virtual private network protocol; and the adjustable parameters are optimized:
  with a brute force search of every permutation in a parameter space of the adjustable parameters; or
  one at a time with greedy optimization algorithm.

2. The medium of claim 1, wherein:
the different respective sets of configuration settings each include more than three different adjustable parameters by which virtual private network connections between the client computing device and the virtual private network server are configured; and
each of the variable parameters has three or more different respective options among the different respective sets of configuration settings.

3. The medium of claim 1, wherein:
the virtual private network connection settings are automatically configured based on sensed network conditions within a parameter space of more than 20 different permutations of configuration settings; and
subsequent connections are initialized to a last-used connection stored in local memory or a remote data store.

4. The medium of claim 1, wherein:
the virtual private network connection settings are automatically configured based on sensed network conditions within a parameter space of more than 10,000 different permutations of configuration settings.

5. The medium of claim 1, wherein:
the virtual private network client, the virtual private network server, or both, are configured to iterate through different ones of the configuration settings until sensed metrics of network conditions satisfy a threshold.

6. The medium of claim 1, wherein:
the sensed network conditions include metrics indicative of two or more of the following: ability to communicate any data, packet loss, latency, or bandwidth.

7. The medium of claim 1, wherein:
the plurality of different adjustable parameters of each set of configuration settings comprise at least two of the following: port number, transport layer protocol, destination address, or virtual private network protocol.

8. The medium of claim 1, wherein:
the virtual private network server is configured to concurrently participate in virtual private network connections with more than 256 different computing devices.

9. The medium of claim 1, wherein:
the adjustable parameters are optimized one at a time with an optimization algorithm.

10. The medium of claim 1, wherein the operations comprise:
storing a security credential, or cryptographic hash value based on the security credential, by which the client computing device is authenticated to the virtual private network server in a tamper-evident, immutable data repository.

11. The medium of claim 1, wherein the operations comprise:
receiving a request with a network controller to quarantine the client computing device or a user of the client computing device; and
in response to the request, communicating a message between the network controller and the virtual private network server that causes the virtual private network server to prevent at least some communications from the client computing device from reaching a destination network address.

12. The medium of claim 1, wherein the operations comprise:
applying a plurality of rules with an internal controls engine to network traffic from the client computing device communicated via the virtual private network connection configured with the selected set of configuration settings; and
detecting that the network traffic satisfies criteria of a given rule and, in response, effectuating an action specified, at least in part, by the given rule.

13. The medium of claim 1, wherein the operations comprise:
executing an operating system on the client computing device;
executing an operating system on the virtual private network server;
communicating via a local area network; and
executing a plurality of enterprise software applications accessed via the virtual private network connection formed with selected set of configuration settings.

14. A method, comprising:
executing, with one or more processors, a virtual private network client application on a client computing device;
connecting, with one or more processors, the client computing device to a virtual private network server via one or more virtual private network connections, wherein:
  the one or more virtual private network connection each form an encrypted tunnel between the client computing device and the virtual private network server;
  the one or more virtual private network connections apply different respective sets of configuration settings to configure the respective virtual private network connection;
  the different respective sets of configuration settings are applied concurrently on different virtual private network connections, on the same virtual private network connection at different times, or both;
  the different respective sets of configuration settings each include a plurality of different adjustable parameters by which virtual private network connections between the client computing device and the virtual private network server are configured; and
  each of the parameters takes a different value between at least one pair of the different respective sets of configuration settings;
communicating or attempting to communicate, with one or more processors, between the client computing device and the virtual private network server via each of the one or more virtual private network connections while the different sets of configuration settings are applied;
sensing, with one or more processors, a plurality of sets of one or more metrics of network conditions of the one or more virtual private network connections during communicating or attempting to communicate while the different sets of configuration settings are applied;
selecting, with one or more processors, a set of configuration settings from among the different respective sets of configuration settings based on the plurality of sets of one or more metrics;
communicating, with one or more processors, between the virtual private network server and the client computing device with a virtual private network connection configured with the selected set of configuration settings; and
logging data descriptive of at least some communication between the virtual private network server and the client computing device in tamper-evident, immutable data repository having a directed acyclic graph with edges defined at least in part by cryptographic hash pointers, wherein:
- virtual private network connection settings are automatically configured based on sensed network conditions;
- a plurality of different virtual private network connections are formed concurrently between the client computing device and the virtual private server and a plurality of different sets of configuration settings are tested concurrently;
- the virtual private network client, the virtual private network server, or both, are configured to:
  - iterate through different ones of the configuration settings;
  - calculate respective network condition scores based on the sensed metrics of network conditions; and
  - select the set of configuration settings based on a set of configuration settings producing a highest or lowest score;
- the sensed network conditions include metrics indicative of each of the following: ability to communicate any data, packet loss, latency, and bandwidth;
- the plurality of different adjustable parameters of each set of configuration settings comprise each of the following: port number, transport layer protocol, destination address, and virtual private network protocol; and
- the adjustable parameters are optimized:
  - with a brute force search of every permutation in a parameter space of the adjustable parameters; or
  - one at a time with greedy optimization algorithm.

15. The method of claim 14, wherein:
the different respective sets of configuration settings each include more than three different adjustable parameters by which virtual private network connections between the client computing device and the virtual private network server are configured; and
each of the variable parameters has three or more different respective options among the different respective sets of configuration settings.

16. The method of claim 14, wherein:
the virtual private network connection settings are automatically configured based on sensed network conditions within a parameter space of more than 20 different permutations of configuration settings; and
subsequent connections are initialized to a last-used connection stored in local memory or a remote data store.

17. The method of claim 14, wherein:
the virtual private network connection settings are automatically configured based on sensed network conditions within a parameter space of more than 10,000 different permutations of configuration settings.

18. The method of claim 14, wherein:
the virtual private network client, the virtual private network server, or both, are configured to iterate through different ones of the configuration settings until sensed metrics of network conditions satisfy a threshold.

19. The method of claim 14, wherein:
the sensed network conditions include metrics indicative of two or more of the following: ability to communicate any data, packet loss, latency, or bandwidth.

20. The method of claim 14, wherein:
the plurality of different adjustable parameters of each set of configuration settings comprise at least two of the following: port number, transport layer protocol, destination address, or virtual private network protocol.

21. The method of claim 14, wherein:
the virtual private network server is configured to concurrently participate in virtual private network connections with more than 256 different computing devices.

22. The method of claim 14, wherein:
the adjustable parameters are optimized one at a time with an optimization algorithm.

23. The method of claim 14, comprising:
storing a security credential, or cryptographic hash value based on the security credential, by which the client computing device is authenticated to the virtual private network server in a tamper-evident, immutable data repository.

24. The method of claim 14, comprising:
receiving a request with a network controller to quarantine the client computing device or a user of the client computing device; and
in response to the request, communicating a message between the network controller and the virtual private network server that causes the virtual private network server to prevent at least some communications from the client computing device from reaching a destination network address.

25. The method of claim 14, comprising:
applying a plurality of rules with an internal controls engine to network traffic from the client computing device communicated via the virtual private network connection configured with the selected set of configuration settings; and
detecting that the network traffic satisfies criteria of a given rule and, in response, effectuating an action specified, at least in part, by the given rule.

26. The method of claim 14, comprising:
executing an operating system on the client computing device;
executing an operating system on the virtual private network server;
communicating via a local area network; and
executing a plurality of enterprise software applications accessed via the virtual private network connection formed with selected set of configuration settings.

* * * * *